(12) United States Patent
Hosomi

(10) Patent No.: US 11,731,459 B2
(45) Date of Patent: Aug. 22, 2023

(54) NON-PNEUMATIC TIRE

(71) Applicant: Toyo Tire Corporation, Itami (JP)

(72) Inventor: Kazumasa Hosomi, Itami (JP)

(73) Assignee: Toyo Tire Corporation, Itami (JP)

( * ) Notice: Subject to any disclaimer, the term of this patent is extended or adjusted under 35 U.S.C. 154(b) by 381 days.

(21) Appl. No.: 17/030,811

(22) Filed: Sep. 24, 2020

(65) Prior Publication Data

US 2021/0114413 A1 Apr. 22, 2021

(30) Foreign Application Priority Data

Oct. 17, 2019 (JP) .................................. 2019-190513

(51) Int. Cl.
*B60C 7/18* (2006.01)
*B60C 7/14* (2006.01)

(52) U.S. Cl.
CPC ................ *B60C 7/18* (2013.01); *B60C 7/143* (2013.01); *B60C 7/146* (2021.08)

(58) Field of Classification Search
CPC .......... B60C 7/143; B60C 7/146; B60C 7/18; B60C 7/107
See application file for complete search history.

(56) References Cited

U.S. PATENT DOCUMENTS

| | | | | |
|---|---|---|---|---|
| 3,018,809 A | * | 1/1962 | Bernard ................ | B60C 15/028 |
| | | | | 152/301 |
| 2009/0173421 A1 | * | 7/2009 | Love ........................ | B60C 7/10 |
| | | | | 152/11 |
| 2011/0272254 A1 | * | 11/2011 | Anderfaas ................ | B60B 9/26 |
| | | | | 492/15 |
| 2019/0061428 A1 | | 2/2019 | Iwamura et al. | |
| 2019/0070902 A1 | * | 3/2019 | Kajiwara .................. | B60C 7/18 |

(Continued)

FOREIGN PATENT DOCUMENTS

| CN | 109466252 A | 3/2019 |
|---|---|---|
| EP | 3 446 887 A1 | 2/2019 |

(Continued)

OTHER PUBLICATIONS

Office Action dated Jun. 10, 2022, issued in counterpart CN application No. 202010992509.4, with English translation. (14 pages).

(Continued)

*Primary Examiner* — Kip T Kotter
(74) *Attorney, Agent, or Firm* — WHDA, LLP

(57) ABSTRACT

In a non-pneumatic tire, the plurality of connecting portions comprise first connecting portions extending in such fashion as to be directed from a first side in a tire width direction of an inner annular portion toward a second side in the tire width direction of an outer annular portion, and second connecting portions extending in such fashion as to be directed from the second side in the tire width direction of the inner annular portion toward the first side in the tire width direction of the outer annular portion, and at least one of the plurality of connecting portions comprises a main body portion having a width that is constant or that increases in tapered fashion by a constant ratio as viewed in the tire width direction, and an reinforcing portion that connects an end in a tire circumferential direction of the main body portion and the annular portion.

10 Claims, 11 Drawing Sheets

(56) References Cited

U.S. PATENT DOCUMENTS

2019/0070903 A1    3/2019  Tsuji
2019/0070904 A1*   3/2019  Kitamura ................. B60C 7/14
2019/0070905 A1    3/2019  Kajiwara

FOREIGN PATENT DOCUMENTS

JP        2015-39986 A     3/2015
JP        2019-038346 A    3/2019

OTHER PUBLICATIONS

Extended European Search Report dated Feb. 8, 2021, issued in counterpart EP Application No. 20199528.9. (35 pages).
Office Action dated May 23, 2023, issued in counterpart JP application No. 2019-190513, with English translation. (4 pages).

* cited by examiner

NON-PNEUMATIC TIRE

CROSS REFERENCE TO RELATED APPLICATIONS

This application claims the benefit of priority of Japanese application no. 2019-190513, filed on Oct. 17, 2019, which is incorporated herein by reference.

BACKGROUND OF THE INVENTION

Field of the Invention

The present disclosure relates to a non-pneumatic tire.

Description of the Related Art

Conventionally, a non-pneumatic tire might, for example, comprise an inner annular portion and an outer annular portion that are arranged in concentric fashion, and a plurality of connecting portions that connect the inner annular portion and the outer annular portion (e.g., JP-A 2015-39986). The plurality of connecting portions might comprise first connecting portion(s) extending in such fashion as to be directed from a first side in the tire width direction of the inner annular portion toward a second side in the tire width direction of the outer annular portion, and second connecting portion(s) extending in such fashion as to be directed from the second side in the tire width direction of the inner annular portion toward the first side in the tire width direction of the outer annular portion.

It so happens that forces (drive forces and braking forces) from the wheel hub are transmitted to the outer annular portion by way of the inner annular portion and the connecting portions. At such time, any deformation in the tire circumferential direction on the part of the connecting portions will cause a corresponding decrease in ability to cause forces to be transmitted from the wheel hub to the outer annular portion.

SUMMARY OF THE INVENTION

The problem is therefore to provide a non-pneumatic tire that will make it possible to increase rigidity in the tire circumferential direction of the connecting portions.

There is provided a non-pneumatic tire comprises:
an inner annular portion and an outer annular portion that are arranged in concentric fashion; and
a plurality of connecting portions that connect the inner annular portion and the outer annular portion;
wherein the plurality of connecting portions comprise first connecting portions extending in such fashion as to be directed from a first side in a tire width direction of the inner annular portion toward a second side in the tire width direction of the outer annular portion, and second connecting portions extending in such fashion as to be directed from the second side in the tire width direction of the inner annular portion toward the first side in the tire width direction of the outer annular portion; and
wherein at least one of the plurality of connecting portions comprises a main body portion having a width that is constant or that increases in tapered fashion by a constant ratio as viewed in the tire width direction, and an inner reinforcing portion that connects an end in a tire circumferential direction of the main body portion and the inner annular portion.

Further, there is provided a non-pneumatic tire comprises:
an inner annular portion and an outer annular portion that are arranged in concentric fashion; and
a plurality of connecting portions that connect the inner annular portion and the outer annular portion;
wherein the plurality of connecting portions comprise first connecting portions extending in such fashion as to be directed from a first side in a tire width direction of the inner annular portion toward a second side in the tire width direction of the outer annular portion, and second connecting portions extending in such fashion as to be directed from the second side in the tire width direction of the inner annular portion toward the first side in the tire width direction of the outer annular portion; and
wherein at least one of the plurality of connecting portions comprises a main body portion having a width that is constant or that increases in tapered fashion by a constant ratio as viewed in the tire width direction, and an outer reinforcing portion that connects an end in a tire circumferential direction of the main body portion and the outer annular portion.

Further, the non-pneumatic tire may have a configuration in which:
wherein the at least one of the plurality of connecting portions further comprises an outer reinforcing portion that connects the end in the tire circumferential direction of the main body portion and the outer annular portion.

Further, the non-pneumatic tire may have a configuration in which:
wherein volume of the inner reinforcing portion is greater than volume of the outer reinforcing portion.

Further, the non-pneumatic tire may have a configuration in which:
wherein the first connecting portions and the second connecting portions are arrayed in alternating fashion in the tire circumferential direction;
as viewed in the tire width direction, the main body portion of at least one of the first connecting portions appears to be separated in the tire circumferential direction from the main body portion of an adjacent one of the second connecting portions which is adjacent to the at least one first connecting portion in the tire circumferential direction;
the at least one first connecting portion comprises a first inner joint by which the at least one first connecting portion is joined to the inner annular portion;
the adjacent second connecting portion comprises a second inner joint by which the adjacent second connecting portion is joined to the inner annular portion; and
the first inner joint appears to overlap the second inner joint as viewed in the tire width direction.

Further, the non-pneumatic tire may have a configuration in which:
wherein the adjacent second connecting portion comprises a main body joint by which the main body portion of the adjacent second connecting portion is joined to the inner annular portion; and
the first inner joint appears to overlap the main body joint of the adjacent second connecting portion as viewed in the tire width direction.

Further, the non-pneumatic tire may have a configuration in which:
wherein the inner reinforcing portion of the at least one first connecting portion comprises an inner portion and an outer portion in the tire width direction;
division into the inner portion and the outer portion is based on bisection of the inner reinforcing portion in the tire width direction; and volume of the inner portion is greater than volume of the outer portion.

Further, the non-pneumatic tire may have a configuration in which:

wherein the first connecting portions and the second connecting portions are arrayed in alternating fashion in the tire circumferential direction;

as viewed in the tire width direction, the main body portion of at least one of the first connecting portions appears to be separated in the tire circumferential direction from the main body portion of an adjacent one of the second connecting portions which is adjacent to the at least one first connecting portion in the tire circumferential direction;

the at least one first connecting portion comprises a first outer joint by which the at least one first connecting portion is joined to the outer annular portion;

the adjacent second connecting portion comprises a second outer joint by which the adjacent second connecting portion is joined to the outer annular portion; and the first outer joint appears to overlap the second outer joint as viewed in the tire width direction.

Further, the non-pneumatic tire may have a configuration in which:

wherein the adjacent second connecting portion comprises a main body joint by which the main body portion of the adjacent second connecting portion is joined to the outer annular portion; and the first outer joint appears to overlap the main body joint of the adjacent second connecting portion as viewed in the tire width direction.

Further, the non-pneumatic tire may have a configuration in which:

wherein the outer reinforcing portion of the at least one first connecting portion comprises an inner portion and an outer portion in the tire width direction;

division into the inner portion and the outer portion is based on bisection of the outer reinforcing portion in the tire width direction; and volume of the inner portion is greater than volume of the outer portion.

Further, the non-pneumatic tire may have a configuration in which:

wherein the first connecting portions and the second connecting portions are arrayed in alternating fashion in the tire circumferential direction; and the inner reinforcing portion of at least one of the first connecting portions is contiguous with the inner reinforcing portion of an adjacent one of the first connecting portions which is adjacent to the at least one first connecting portion in the tire circumferential direction.

Further, the non-pneumatic tire may have a configuration in which:

wherein the outer reinforcing portion of the at least one first connecting portion is separated in the tire circumferential direction from the outer reinforcing portion of the adjacent first connecting portion.

Further, the non-pneumatic tire may have a configuration in which:

wherein the inner reinforcing portion is one of a plurality of inner reinforcing portions present at the non-pneumatic tire;

the outer reinforcing portion is one of a plurality of outer reinforcing portions present at the non-pneumatic tire; and that portion of total volume of all of the inner reinforcing portions and all of the outer reinforcing portions which is disposed on the first side in the tire width direction of a tire equatorial plane is greater than that portion of total volume of all of the inner reinforcing portions and all of the outer reinforcing portions which is disposed on the second side in the tire width direction of the tire equatorial plane.

DETAILED DESCRIPTION OF THE INVENTION

Below, an embodiment of a non-pneumatic tire is described with reference to FIG. 1 through FIG. 10. At the respective drawings (and the same is true for FIG. 11 through FIG. 18), note that dimensional ratios at the drawings and actual dimensional ratios are not necessarily consistent, and note further that dimensional ratios are not necessarily consistent from drawing to drawing.

Figure 1:
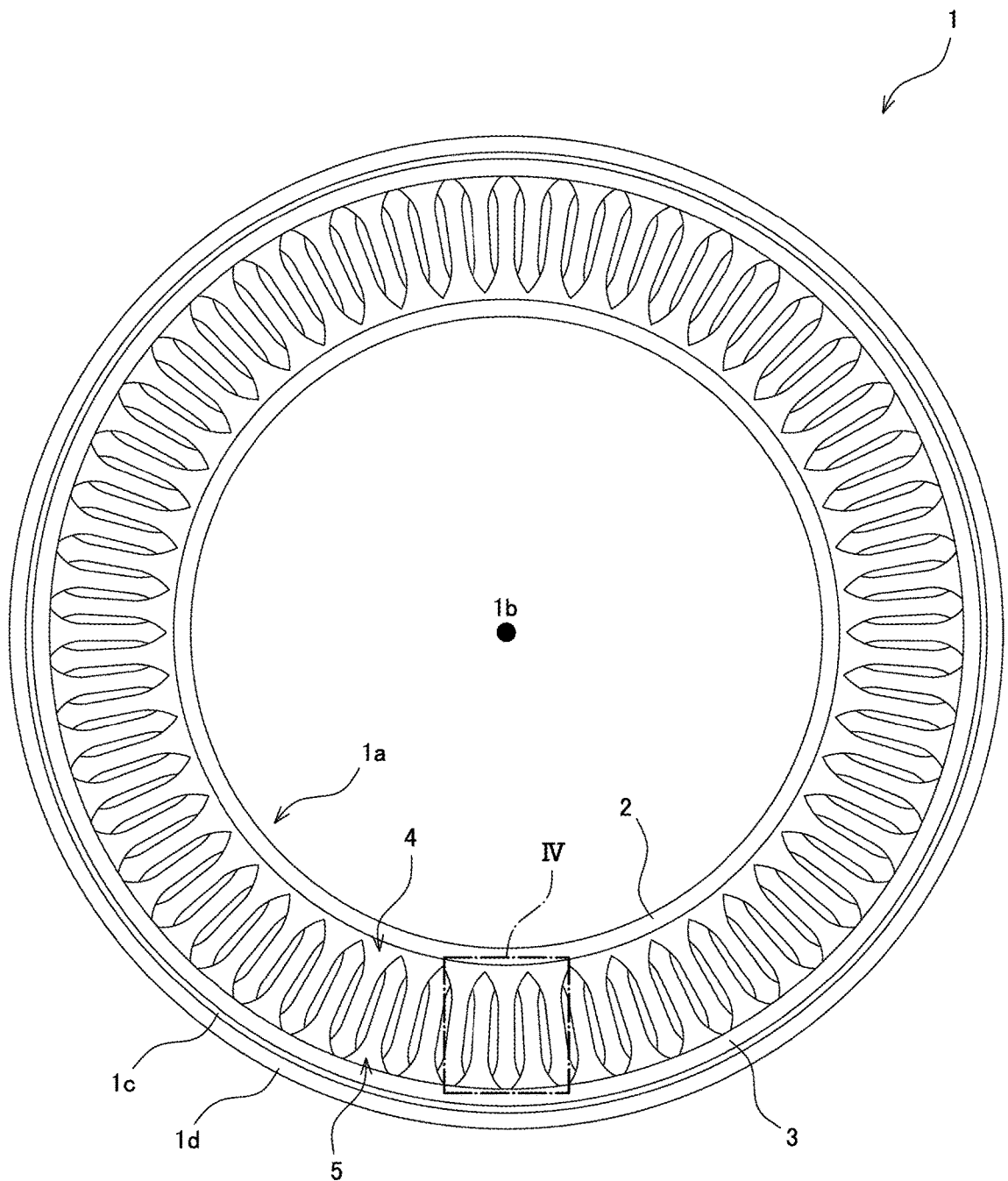
FIG. 1 is a full side view of a non-pneumatic tire associated with an embodiment.

As shown in FIG. 1, non-pneumatic tire (hereinafter sometimes referred to as simply "tire") 1 associated with the present embodiment comprises support structure 1a which supports the load from a vehicle. Support structure 1a comprises inner annular portion 2 and outer annular portion 3 which are arranged in concentric fashion, and a plurality of connecting portions 4, 5 which connect inner annular portion 2 and outer annular portion 3. Note that outer annular portion 3 is arranged at a location toward the exterior from inner annular portion 2 in such fashion that inner annular portion 2 is contained therewithin, connecting portions 4, 5 being arranged in the space between inner annular portion 2 and outer annular portion 3.

At the respective drawings, first direction D1 is the tire width direction D1 which is parallel to axis 1b which is the axis of rotation of tire 1, second direction D2 is the tire radial direction D2 which is the direction of the diameter of tire 1, and third direction D3 is the tire circumferential direction D3 which is the direction that is circumferential about axis 1b. Furthermore, tire equatorial plane S1 is a plane that is located centrally in the tire width direction D1 of tire 1 and that is perpendicular to axis 1b, and tire meridional planes are planes that are perpendicular to tire equatorial plane S1 and that contain axis 1b.

In the tire width direction D1, note that the side toward the interior is the side which is nearer to tire equatorial plane S1, and note that the side toward the exterior is the side which is farther from tire equatorial plane S1. Furthermore, in the tire radial direction D2, the side toward the interior is the side which is nearer to axis 1b, and the side toward the exterior is the side which is farther from axis 1b.

Furthermore, to reinforce support structure 1a, tire 1 comprises reinforcing layer 1c which is arranged at a location toward the exterior from support structure 1a, and tread region 1d which comes in contact with the ground and which is arranged at a location toward the exterior from reinforcing layer 1c. Furthermore, while not shown in the drawings, tire 1 may be such that member(s), e.g., for accommodation of wheel hub(s) and/or rim(s), are provided at location(s) toward the interior from support structure 1a. For example, so as to allow it to be mounted on a wheel hub and/or rim, it is preferred that the inner circumferential surface of inner annular portion 2 be provided with intercuspation or the like for maintenance of engagement characteristics.

While there is no particular limitation with respect to the material(s) employed at support structure 1a, support structure 1a might, for example, be formed from elastic material(s). Furthermore, polyester elastomer(s) and/or other such thermoplastic elastomer(s), natural rubber(s) and/or other such crosslinked rubber(s), and/or other resin(s) (e.g., polyethylene resin(s) and/or other such thermoplastic resin(s), and/or polyurethane resin(s) and/or other such thermosetting resin(s)) might, for example, be employed as base material(s) at support structure 1a. Furthermore, fiber(s) and/or metal cord(s) and/or other such reinforcing material(s) might, for example, be embedded at the interior of such base material(s).

Reinforcing layer 1c might, for example, be constituted such that steel cord(s), or CFRP, GFRP, or other such fiber-reinforced plastic cord(s) are arrayed in more or less parallel fashion with respect to the tire width direction D1, or from cylindrical metal ring(s), high-modulus resin ring(s), or the like. Furthermore, tread region 1d might, for example, be constituted from rubber, resin, or the like in similar fashion as a conventional pneumatic tire, and may be provided with patterning (grooves) at the outer circumferential surface thereof in similar fashion as a conventional pneumatic tire.

It is preferred from the standpoint of improving uniformity that inner annular portion 2 be, for example, cylindrical and of constant thickness (here understood to mean not only the situation in which this is the same but also situations in which this is approximately the same such as when there are manufacturing errors and/or other such errors). Moreover, while there is no particular limitation with respect thereto, the thickness (dimension in the tire radial direction D2) of inner annular portion 2 might, for example, be chosen as appropriate from the standpoint of ensuring improvement in weight reduction and endurance while permitting adequate transmission of force to connecting portions 4, 5.

While there is no particular limitation with respect thereto, the inside diameter of inner annular portion 2 might, for example, be chosen as appropriate to accommodate the dimensions and so forth of the rim and/or wheel hub on which tire 1 is to be mounted. Furthermore, while there is no particular limitation with respect thereto, the width (dimension in the tire width direction D1) of inner annular portion 2 might, for example, be chosen as appropriate in correspondence to the intended usage thereof, axle length, and so forth.

It is preferred from the standpoint of improving uniformity that outer annular portion 3 be, for example, cylindrical and of constant thickness (here understood to mean not only the situation in which this is the same but also situations in which this is approximately the same). Moreover, while there is no particular limitation with respect thereto, the thickness (dimension in the tire radial direction D2) of outer annular portion 3 might, for example, be chosen as appropriate from the standpoint of ensuring improvement in weight reduction and endurance while permitting adequate transmission of force from connecting portions 4, 5.

While there is no particular limitation with respect thereto, the inside diameter of outer annular portion 3 might, for example, be chosen as appropriate in correspondence to the intended usage thereof and so forth. Furthermore, while there is no particular limitation with respect thereto, the width (dimension in the tire width direction D1) of outer annular portion 3 might, for example, be chosen as appropriate in correspondence to the intended usage thereof and so forth. Moreover, it is preferred that the width of outer annular portion 3 be the same as the width of inner annular portion 2.

Figure 2:
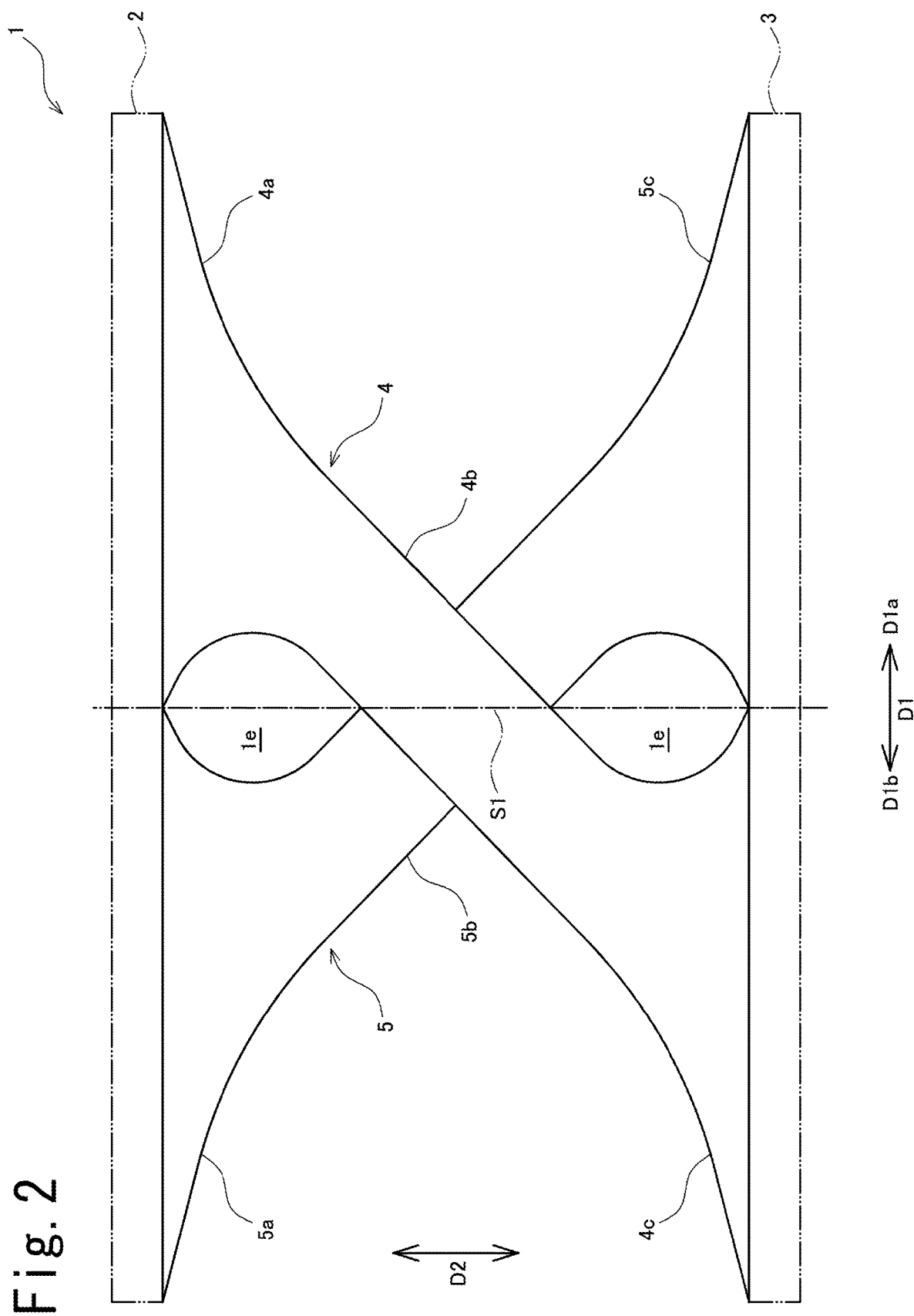
FIG. 2 is a drawing showing the principal components of a non-pneumatic tire associated with same embodiment as viewed in the tire circumferential direction.
Figure 3:
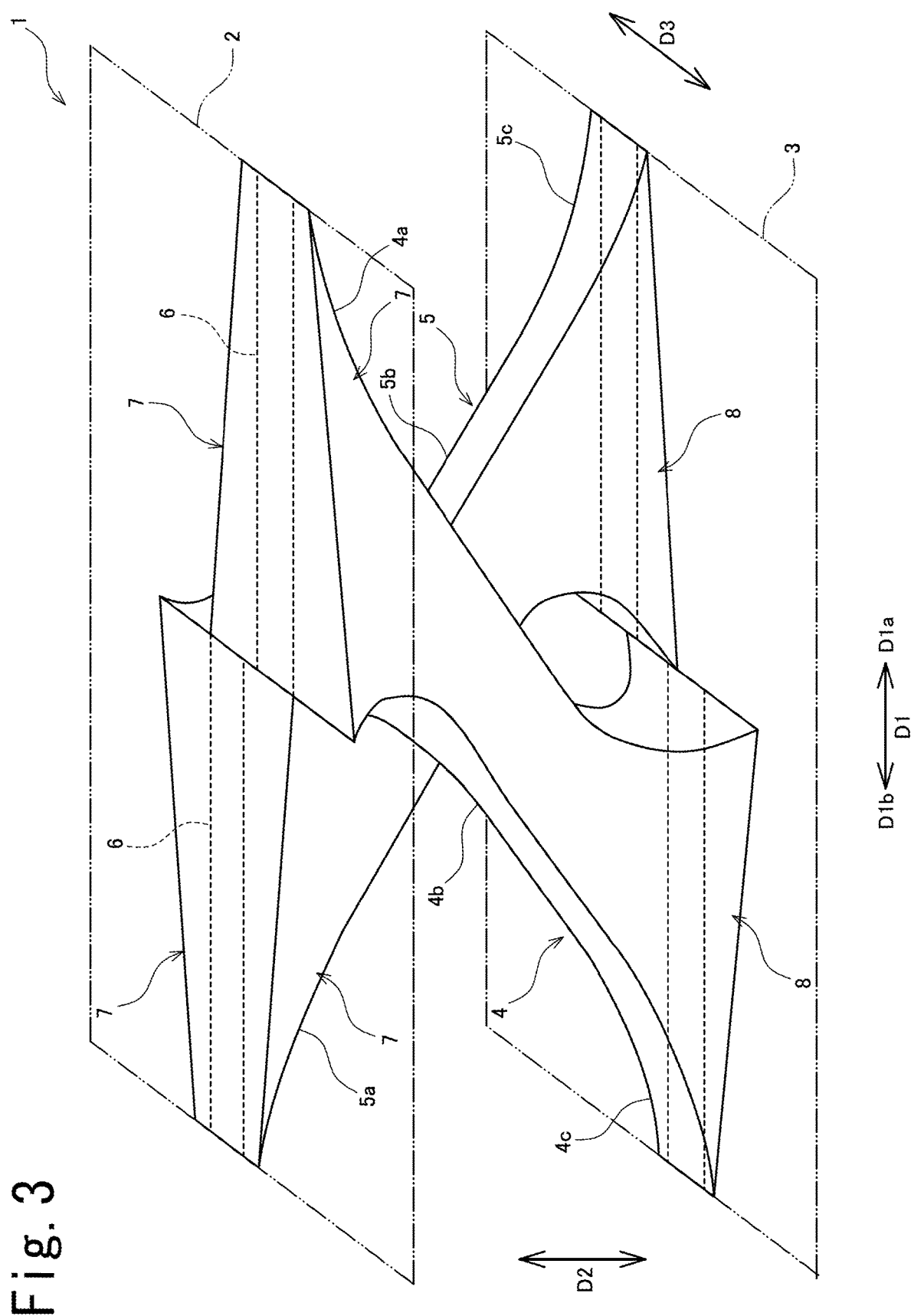
FIG. 3 is a perspective view of the principal components of a non-pneumatic tire associated with same embodiment in which only two connecting portions are shown.

As shown in FIG. 2 and FIG. 3, connecting portions 4, 5 are formed so as to be planar. In addition, connecting portions 4, 5 are arranged so as to face the tire circumferential direction D3. Furthermore, the plurality of connecting portions 4, 5 comprise a plurality of first connecting portions 4 and a plurality of second connecting portions 5.

First connecting portions 4 extend in such fashion as to be directed from the first side (the right side in FIG. 2 and FIG. 3; hereinafter also referred to as the "first width direction side") D1a in the tire width direction D1 of inner annular portion 2 toward the second side (the left side in FIG. 2 and FIG. 3; hereinafter also referred to as the "second width direction side") D1*b* in the tire width direction D1 of outer annular portion 3. Furthermore, second connecting portions 5 extend in such fashion as to be directed from the second width direction side D1*b* of inner annular portion 2 toward the first width direction side D1*a* of outer annular portion 3.

Thus, as viewed in the tire circumferential direction D3, first connecting portion 4 and second connecting portion 5 extend so as to be inclined in mutually opposite directions. In addition, first connecting portion 4 and second connecting portion 5 appear to intersect as viewed in the tire circumferential direction D3. This causes formation between first connecting portion 4 and second connecting portion 5 of what appear to be closed space(s) 1*e* as viewed in the tire circumferential direction D3. As a result, because this makes it possible to increase elasticity, it is possible to improve performance with respect to ride comfort.

In addition, first connecting portions 4 and second connecting portions 5 are arrayed in alternating fashion in the tire circumferential direction D3. This will make it possible to further reduce distribution of contact patch pressure during driving. Moreover, in accordance with the present embodiment, first connecting portions 4 and second connecting portions 5 are shaped so as to be symmetric with respect to the tire equatorial plane S1 as viewed in the tire circumferential direction D3.

Furthermore, widths (dimension in the tire width direction D1) of inner end portions 4*a*, 5*a* in the tire radial direction D2 of connecting portions 4, 5 are greater than widths of central portions 4*b*, 5*b* of connecting portions 4, 5, and widths of outer end portions 4*c*, 5*c* in the tire radial direction D2 of connecting portions 4, 5 are greater than widths of central portions 4*b*, 5*b* of connecting portions 4, 5. More specifically, widths of connecting portions 4, 5 are constant (here understood to mean not only the situation in which these are the same but also situations in which these are approximately the same) at central portions 4*b*, 5*b*, and increase as one proceeds from central portions 4*b*, 5*b* toward end portions 4*a*, 4*c*, 5*a*, 5*c*.

While there is no particular limitation with respect thereto, widths of connecting portions 4, 5 might, for example, be chosen as appropriate from the standpoint of ensuring improvement in weight reduction and endurance while permitting adequate transmission of force from inner annular portion 2 and outer annular portion 3. Furthermore, while there is no particular limitation with respect thereto, thicknesses (width dimension as viewed in the tire width direction D1) of connecting portions 4, 5 might, for example, be chosen as appropriate from the standpoint of ensuring improvement in weight reduction and endurance while permitting adequate transmission of force from inner annular portion 2 and outer annular portion 3.

While there is no particular limitation with respect thereto, the relationship (relative magnitudes; ratios) between widths and thicknesses of connecting portions 4, 5 might, for example, be chosen as appropriate from the standpoint of reducing distribution of contact patch pressure while permitting improvement in endurance. It is, for example, preferred that average widths of connecting portions 4, 5 be greater than average thicknesses of connecting portions 4, 5.

A plurality of connecting portions 4, 5 are arrayed along the tire circumferential direction D3, being provided so as to be spaced apart such that there are gaps therebetween. It is preferred from the standpoint of improving uniformity that the lengths of the gaps be, for example, constant (here understood to mean not only the situation in which these are the same but also situations in which these are approximately the same). Furthermore, while there is no particular limitation with respect thereto, the number of connecting portions 4, 5 which are present and the lengths of the gaps might, for example, be chosen as appropriate from the standpoint of improving weight reduction, noise reduction, transmission of motive force, and of ensuring improvement in endurance, while permitting adequate support of the load from the vehicle.

Figure 4:
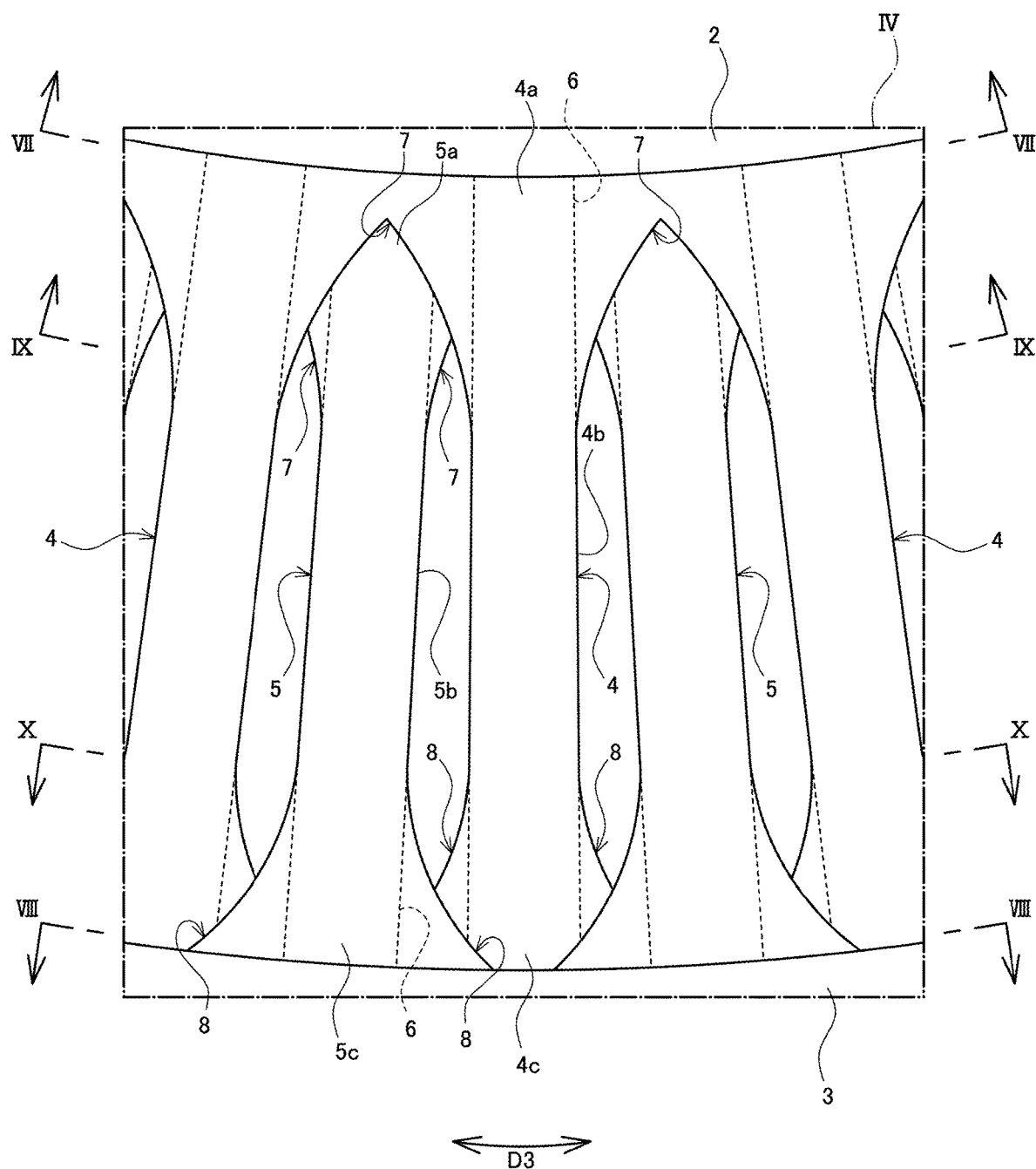
FIG. 4 is an enlarged view of region IV in FIG. 1.

As shown in FIG. 3 and FIG. 4, connecting portions 4, 5 comprise main body portions 6, the thicknesses of which are constant (here understood to mean not only the situation in which these are the same but also situations in which these are approximately the same), and reinforcing portions 7, 8 that cause annular portion 2, 3 to be coupled to tire circumferential direction D3 sides of main body portions 6. Reinforcing portions 7, 8 include inner reinforcing portions 7 that cause inner annular portion 2 to be coupled to tire circumferential direction D3 sides of main body portions 6, and outer reinforcing portions 8 that cause outer annular portion 3 to be coupled to tire circumferential direction D3 sides of main body portions 6.

At FIGS. 3 and 4 (and the same is true for FIGS. 7 and 8, and FIGS. 11 and 12, and FIGS. 17 and 18), note that boundaries between main body portions 6 and reinforcing portions 7, 8 are shown in broken line. Furthermore, while there is no particular limitation with respect thereto, main body portions 6 and reinforcing portions 7, 8 may be formed from the same material(s).

Central portions 4*b*, 5*b* in the tire radial direction D2 of connecting portions 4, 5 are made up of only main body portions 6; inner end portions 4*a*, 5*a* of connecting portions 4, 5 are made up of main body portions 6 and inner reinforcing portions 7; and outer end portions 4*c*, 5*c* of connecting portions 4, 5 are made up of main body portions 6 and outer reinforcing portions 8. This makes it possible to increase the rigidity of connecting portions 4, 5 with respect to the tire circumferential direction D3.

Accordingly, because it will be possible, for example, to suppress occurrence of situations in which connecting portions 4, 5 might otherwise deform in the tire circumferential direction D3, this will make it possible to cause forces (drive forces and braking forces) to be definitively transmitted from the wheel hub to outer annular portion 3. And because it will also be possible, for example, to reduce concentration of stress at end portions 4*a*, 4*c*, 5*a*, 5*c* of connecting portions 4, 5, this will make it possible to improve endurance.

Moreover, thicknesses of inner end portions 4*a*, 5*a* of connecting portions 4, 5 are greater than thicknesses of central portions 4*b*, 5*b* of connecting portions 4, 5, and thicknesses of outer end portions 4*c*, 5*c* of connecting portions 4, 5 are greater than thicknesses of central portions 4*b*, 5*b* of connecting portions 4, 5. More specifically, thicknesses of connecting portions 4, 5 are constant (here understood to mean not only the situation in which these are the same but also situations in which these are approximately the same) at central portions 4*b*, 5*b*, and increase as one proceeds from central portions 4*b*, 5*b* toward end portions 4*a*, 4*c*, 5*a*, 5*c*.

As a result, thicknesses (dimension visible in the tire width direction D1) of inner reinforcing portions 7 increase as one proceeds toward the interior in the tire radial direction D2. Moreover, thicknesses (dimension visible in the tire width direction D1) of outer reinforcing portions 8 increase as one proceeds toward the exterior in the tire radial direction D2.

It so happens that forces from the wheel hub might, for example, arrive at inner annular portion 2 by way of the rim or the like. In addition, forces from the wheel hub are transmitted in the following order: inner annular portion 2, connecting portions 4, 5, outer annular portion 3. Accordingly, for forces from the wheel hub to be effectively transmitted to tread region 1d (see FIG. 1), transmission of forces at upstream locations will be important.

For example, if forces are subject to large losses at upstream locations, i.e., if connecting portions 4, 5 experience large elastic deformations in the tire circumferential direction D3 at locations toward the interior in the tire radial direction D2, it will be impossible for tread region 1d to make contact with the ground in properly oriented fashion. As a result, the poor shape of the contact patch will cause decreased ability for forces from the wheel hub to be transmitted to the surface (tread surface) of tread region 1d.

At the respective connecting portions 4, 5, volumes of inner reinforcing portions 7 are greater than volumes of outer reinforcing portions 8. This makes it possible to increase rigidity at locations toward the interior in the tire radial direction D2 of connecting portions 4, 5, i.e., at locations toward the wheel hub (at upstream locations in terms of transmission of force from the wheel hub). Accordingly, this will make it possible, for example, for forces from the wheel hub to be effectively transmitted to outer annular portion 3.

Furthermore, the size of the gaps between connecting portions 4, 5 that are adjacent in the tire circumferential direction D3 increases as one proceeds toward the exterior in the tire radial direction D2. In this regard, because the volume of inner reinforcing portions 7 is comparatively large, the pivot point (inflection point) during elastic deformation in the tire circumferential direction D3 of connecting portions 4, 5 can be made to lie toward the exterior in the tire radial direction D2. This makes it possible to suppress occurrence of situations in which adjacent connecting portions 4, 5 might otherwise come in contact with each other during elastic deformation in the tire circumferential direction D3 of connecting portions 4, 5.

Moreover, while reinforcing portions 7, 8 increase the rigidity of connecting portions 4, 5, were the weight of tire 1 to become too large this might, for example, cause increase in rolling resistance or the like. In this regard, because the volume of outer reinforcing portions 8 is comparatively small, it is possible to suppress occurrence of situations in which the weight of tire 1 might otherwise become too large.

At tire 1 associated with the present embodiment, as viewed in the tire width direction D1, connecting portions 4, 5 appear to overlap connecting portions 5, 4 that are adjacent with respect thereto in the tire circumferential direction D3. More specifically, inner reinforcing portions 7 of connecting portions 4, 5 appear to overlap inner end portions 5a, 4a of adjacent connecting portions 5, 4 as viewed in the tire width direction D1, and outer reinforcing portions 8 of connecting portions 4, 5 appear to overlap outer end portions 5c, 4c of adjacent connecting portions 5, 4 as viewed in the tire width direction D1.

Even more specifically, inner reinforcing portions 7 of connecting portions 4, 5 appear to overlap main body portions 6 of adjacent connecting portions 5, 4 as viewed in the tire width direction D1, and outer reinforcing portions 8 of connecting portions 4, 5 appear to overlap main body portions 6 of adjacent connecting portions 5, 4 as viewed in the tire width direction D1. Note that, as viewed in the tire width direction D1, main body portions 6 of connecting portions 4, 5 appear to be separated in the tire circumferential direction D3 from main body portions 6 of adjacent connecting portions 5, 4.

Inner reinforcing portions 7 of first connecting portions 4 are contiguous with inner reinforcing portions 7 of first connecting portions 4 that are adjacent with respect thereto in the tire circumferential direction D3. Although not shown in FIG. 4, note that inner reinforcing portions 7 of second connecting portions 5 are also contiguous with inner reinforcing portions 7 of second connecting portions that are adjacent with respect thereto in the tire circumferential direction D3. Thus, inner reinforcing portions 7, 7 of adjacent first connecting portions 4, 4 are mutually contiguous, and inner reinforcing portions 7, 7 of adjacent second connecting portions 5, 5 are mutually contiguous.

Furthermore, outer reinforcing portions 8 of second connecting portions 5 are separated from outer reinforcing portions 8 of second connecting portions 5 that are adjacent thereto in the tire circumferential direction D3. Although not shown in FIG. 4, note that outer reinforcing portions 8 of first connecting portions 4 are also separated from outer reinforcing portions 8 of first connecting portions 4 that are adjacent thereto in the tire circumferential direction D3. Thus, outer reinforcing portions 8, 8 of adjacent first connecting portions 4, 4 are separated from each other in the tire circumferential direction D3, and outer reinforcing portions 8, 8 of adjacent second connecting portions 5, 5 are separated from each other in the tire circumferential direction D3.

Joints 4d, 4e, 5d, 5e that join connecting portions 4, to annular portions 2, 3 will now be described with reference to FIG. 5 through FIG. 10. Below, joints 4d, 5d that join connecting portions 4, 5 to inner annular portion 2 are referred to as inner joints 4d, 5d, and joints 4e, 5e that join connecting portions 4, 5 to outer annular portion 3 are referred to as outer joints 4e, 5e.

Figure 5:
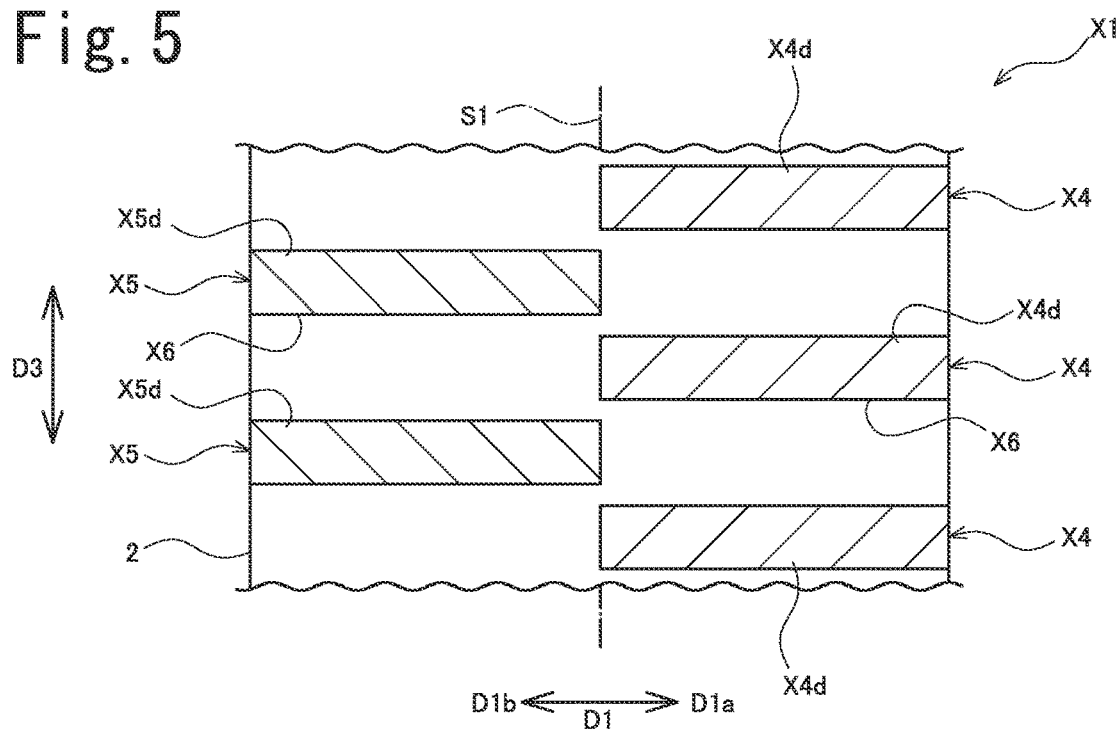
FIG. 5 is a drawing showing joints between connecting portions and the inner annular portion as these would exist if unwrapped so as to lie in a single plane at a non-pneumatic tire associated with a comparative example.
Figure 6:
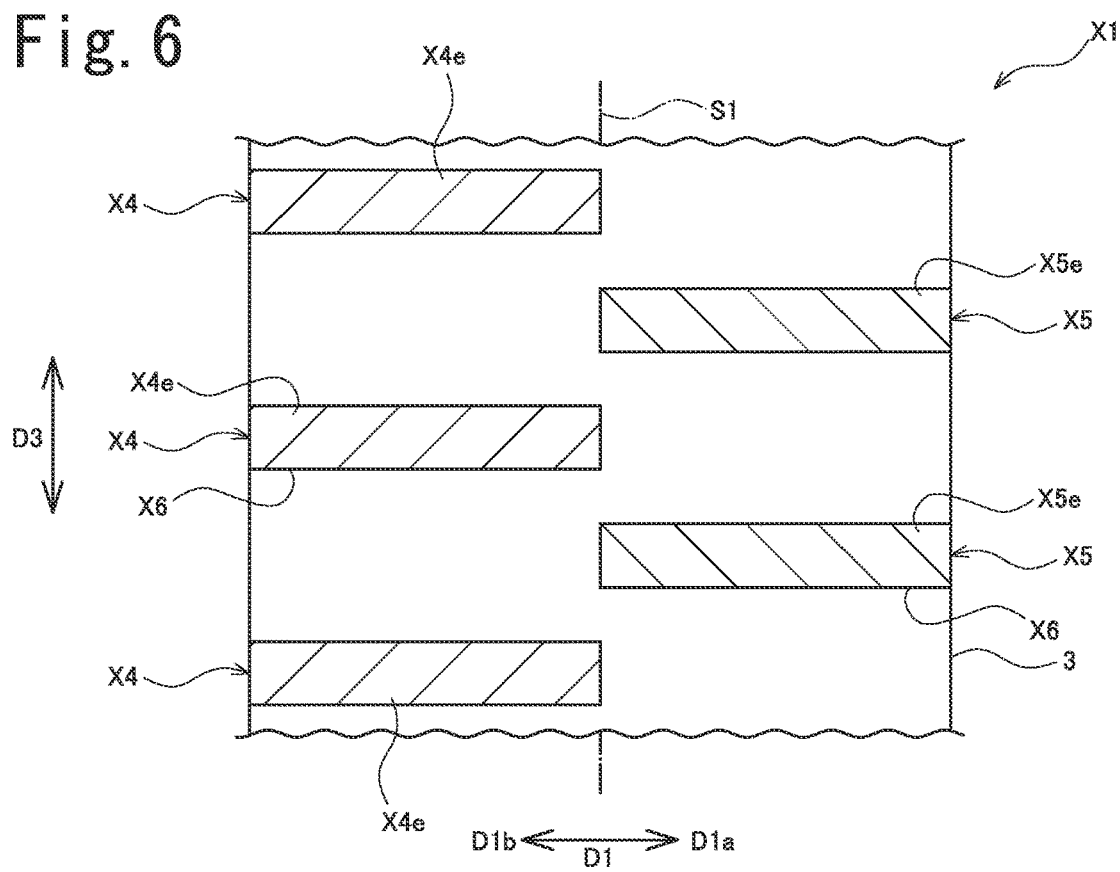
FIG. 6 is a drawing showing joints between connecting portions and the outer annular portion as these would exist if unwrapped so as to lie in a single plane at a non-pneumatic tire associated with same comparative example.

Tire X1 associated with a comparative example will first be described with reference to FIG. 5 and FIG. 6. As shown in FIG. 5 and FIG. 6, unlike tire 1 of the present embodiment, tire X1 associated with the comparative example does not comprise reinforcing portions 7, 8 but is instead a tire X1 in which connecting portions X4, X5 are made up of only main body portions X6.

As shown in FIG. 5, tire X1 associated with the comparative example is such that inner joints X4d, X5d of adjacent connecting portions X4, X5 are separated from each other in the tire circumferential direction D3. Furthermore, as shown in FIG. 6, outer joints X4e, X5e of adjacent connecting portions X4, X5 are separated from each other in the tire circumferential direction D3.

As a result, regions in which joints X4d, X5d (X4e, X5e) are present, and regions in which joints X4d, X5d (X4e, X5e) are not present, are present in alternating fashion in the tire circumferential direction D3. Accordingly, there will be occurrence of localized differences in rigidity in the tire circumferential direction D3.

Furthermore, other joint(s) X4d, X4e, X5d, X5e are not present in region(s) at tire width direction D1 side(s) of region(s) in which joint(s) X4d, X4e, X5d, X5e are present. Accordingly, there will also be occurrence of localized differences in rigidity in the tire width direction D1.

Inner joints 4d, 5d of tire 1 associated with the present embodiment will next be described with reference to FIG. 7 and FIG. 9.

Figure 7:
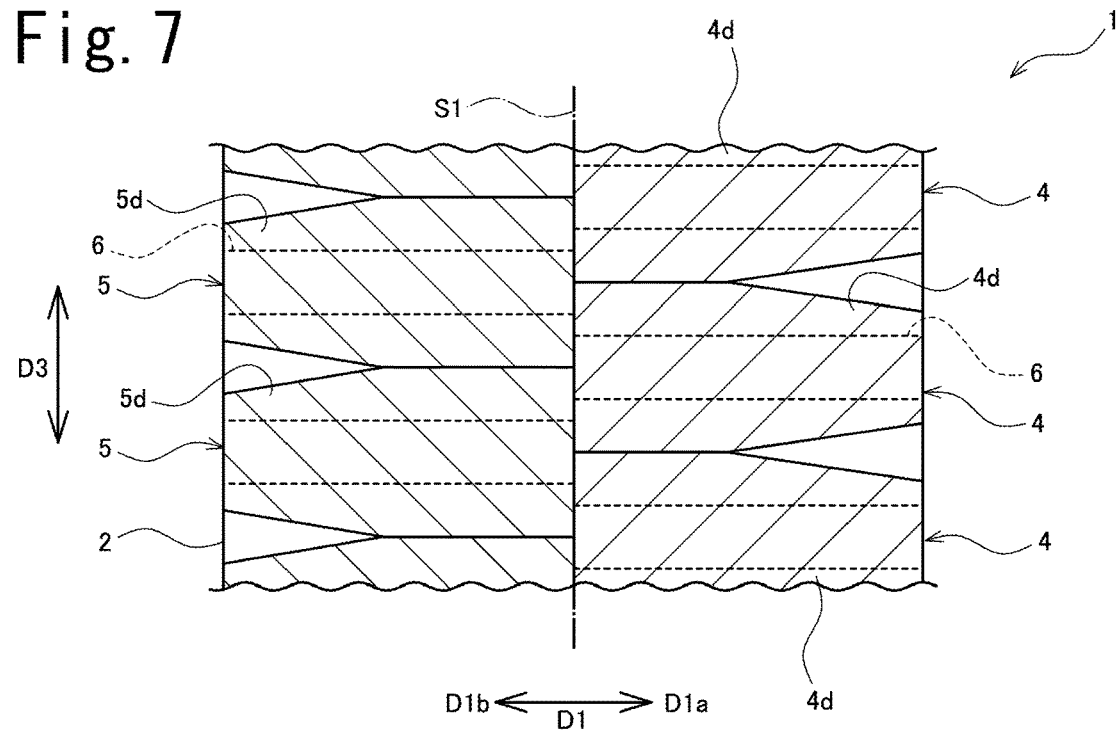
FIG. 7 is a view of a section taken along curve VII-VII in FIG. 4 showing joints between connecting portions and the inner annular portion as these would exist if unwrapped so as to lie in a single plane.
Figure 9:
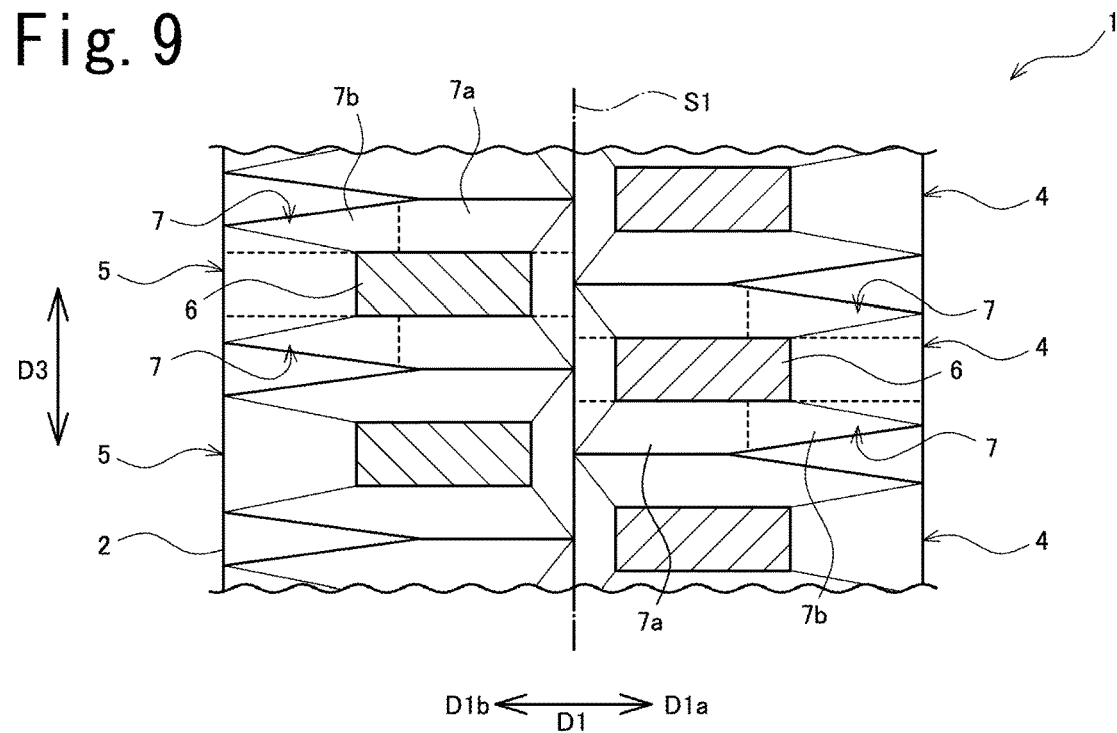
FIG. 9 is a view of a section taken along curve IX-IX in FIG. 4 showing this as it would exist if unwrapped so as to lie in a single plane.

As shown in FIG. 7 and FIG. 9, at tire 1 associated with the present embodiment, inner joints 4d, 5d of adjacent connecting portions 4, 5 appear to mutually overlap as viewed in the tire width direction D1. As a result, inner joints 4d, 5d of adjacent connecting portions 4, 5 are present in mutually continuous fashion in the tire circumferential direction D3. Accordingly, this will make it possible to suppress occurrence of localized differences in rigidity in the tire circumferential direction D3.

Furthermore, as viewed in the tire width direction D1, inner joints 4d, 5d appear to overlap those locations on adjacent inner joints 5d, 4d at which main body portions 6 are joined to inner annular portion 2. As a result, inner joints 5d, 4d of adjacent connecting portions 5, 4 are present in regions at tire width direction D1 sides of regions at locations on connecting portions 4, 5 at which main body portions 6 are joined to inner annular portion 2. Accordingly, this will make it possible to suppress occurrence of localized differences in rigidity in the tire width direction D1.

Moreover, whereas the portions of inner joints 4d, 5d at which rigidity is greatest are the locations at which main body portions 6 are joined to inner annular portion 2, volumes of inner portions 7a in the tire width direction D1 of inner reinforcing portions 7 are greater than volumes of outer portions 7b in the tire width direction D1 of inner reinforcing portions 7.

Moreover, inner portion 7a is that portion which is toward the interior in the tire width direction D1 when inner reinforcing portion 7 is bisected in the tire width direction D1, and outer portion 7b is that portion which is toward the exterior in the tire width direction D1 when inner reinforcing portion 7 is bisected in the tire width direction D1. At FIG. 9, the boundary between inner portion 7a and outer portion 7b is shown in broken line.

As a result, main body portion 6 of first connecting portion 4, inner portion 7a of inner reinforcing portion 7 of adjacent second connecting portion 5, and outer portion 7b of inner reinforcing portion 7 of said second connecting portion 5 are arranged in this order from first width direction side D1a to second width direction side D1b. Furthermore, main body portion 6 of second connecting portion 5, inner portion 7a of inner reinforcing portion 7 of adjacent first connecting portion 4, and outer portion 7b of inner reinforcing portion 7 of said first connecting portion 4 are arranged in this order from second width direction side D1b to first width direction side D1a.

That is, this makes it possible for main body portion 6 of connecting portion 4, 5, inner portion 7a of inner reinforcing portion 7 of adjacent connecting portion 5, 4, and outer portion 7b of inner reinforcing portion 7 of adjacent connecting portion 5, 4 to be arranged in this order in the tire width direction D1 at inner joint 4d, 5d. As a result, it will be possible to cause these to be arranged in order of relative rigidity. Accordingly, this will make it possible to effectively suppress occurrence of localized differences in rigidity in the tire width direction D1.

It will thus be possible to suppress occurrence of localized differences in rigidity in the tire width direction D1 and in the tire circumferential direction D3 at inner end portions 4a, 5a of connecting portions 4, 5 and inner annular portion 2. Accordingly, because it will be possible to suppress occurrence of situations in there might otherwise be concentration of stress, this will make it possible, for example, to cause forces from the wheel hub to be uniformly transmitted to outer annular portion 3 by way of inner annular portion 2 and connecting portions 4, 5.

Outer joints 4e, 5e of tire 1 associated with the present embodiment will next be described with reference to FIG. 8 and FIG. 10.

Figure 8:
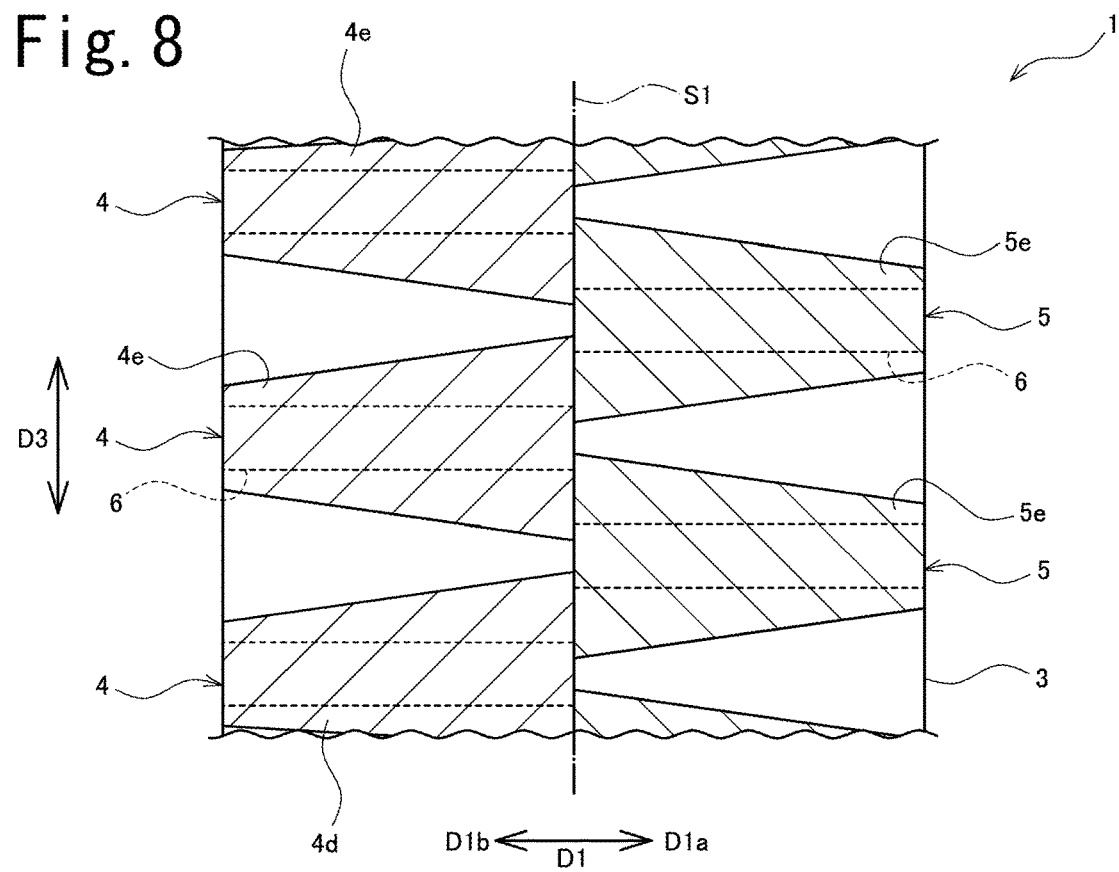
FIG. 8 is a view of a section taken along curve VIII-VIII in FIG. 4 showing joints between connecting portions and the outer annular portion as these would exist if unwrapped so as to lie in a single plane.
Figure 10:
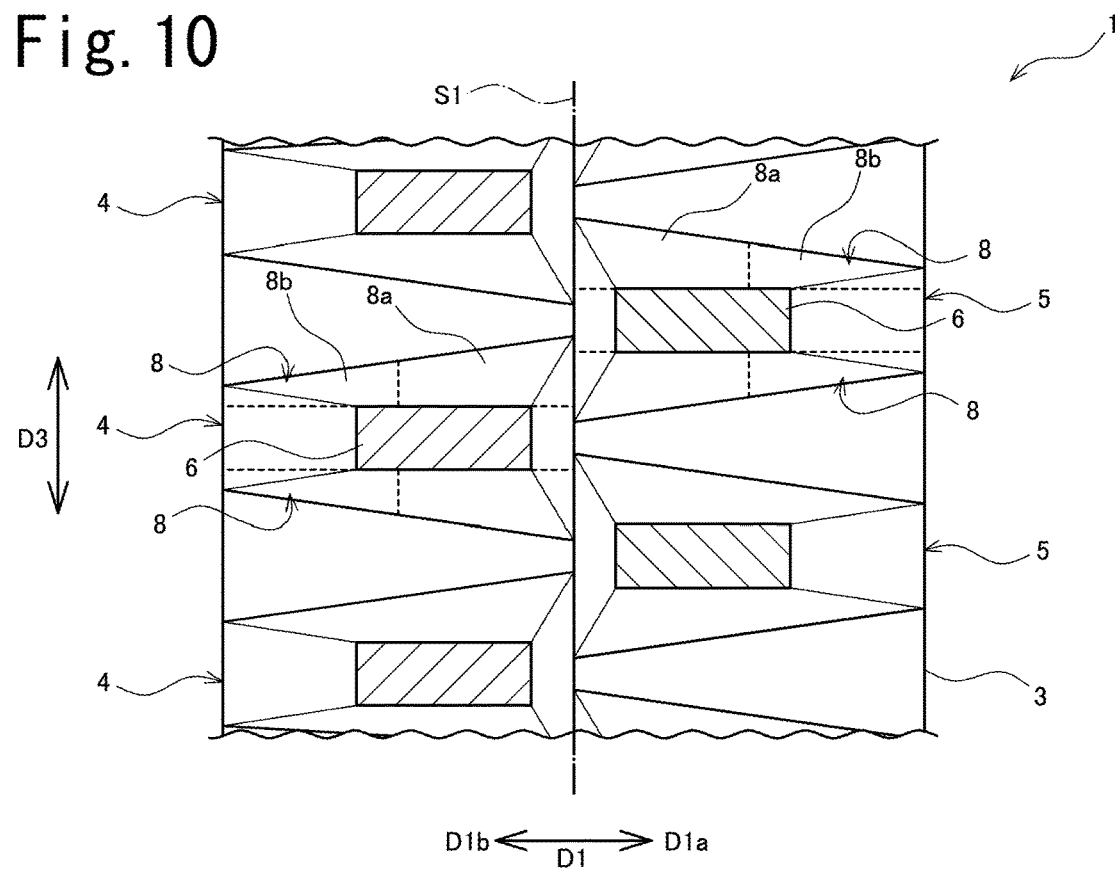
FIG. 10 is a view of a section taken along curve X-X in FIG. 4 showing this as it would exist if unwrapped so as to lie in a single plane.

As shown in FIG. 8 and FIG. 10, at tire 1 associated with the present embodiment, outer joints 4e, 5e of adjacent connecting portions 4, 5 appear to mutually overlap as viewed in the tire width direction D1. As a result, outer joints 4e, 5e of adjacent connecting portions 4, 5 are present in mutually continuous fashion in the tire circumferential direction D3. Accordingly, this will make it possible to suppress occurrence of localized differences in rigidity in the tire circumferential direction D3.

Furthermore, as viewed in the tire width direction D1, outer joints 4e, 5e appear to overlap those locations on adjacent outer joints 5e, 4e at which main body portions 6 are joined to outer annular portion 3. As a result, outer joints 5e, 4e of adjacent connecting portions 5, 4 are present in regions at tire width direction D1 sides of regions at locations on connecting portions 4, 5 at which main body portions 6 are joined to outer annular portion 3. Accordingly, this will make it possible to suppress occurrence of localized differences in rigidity in the tire width direction D1.

Moreover, whereas the portions of outer joints 4e, 5e at which rigidity is greatest are the locations at which main body portions 6 are joined to outer annular portion 3, volumes of inner portions 8a in the tire width direction D1 of outer reinforcing portions 8 are greater than volumes of outer portions 8b in the tire width direction D1 of outer reinforcing portions 8.

Moreover, inner portion 8a is that portion which is toward the interior in the tire width direction D1 when outer reinforcing portions 8 is bisected in the tire width direction D1, and outer portion 8b is that portion which is toward the exterior in the tire width direction D1 when outer reinforcing portions 8 is bisected in the tire width direction D1. At FIG. 10, the boundary between inner portion 8a and outer portion 8b is shown in broken line.

As a result, main body portion 6 of second connecting portion 5, inner portion 8a of outer reinforcing portions 8 of adjacent first connecting portion 4, and outer portion 8b of outer reinforcing portion 8 of said first connecting portion 4 are arranged in this order from first width direction side D1a to second width direction side D1b. Furthermore, main body portion 6 of first connecting portion 4, inner portion 8a of outer reinforcing portion 8 of adjacent second connecting portion 5, and outer portion 8b of outer reinforcing portion 8 of said second connecting portion 5 are arranged in this order from second width direction side D1b to first width direction side D1a.

That is, this makes it possible for main body portion 6 of connecting portion 4, 5, inner portion 8a of outer reinforcing portion 8 of adjacent connecting portion 5, 4, and outer portion 8b of outer reinforcing portion 8 of adjacent connecting portion 5, 4 to be arranged in this order in the tire width direction D1 at outer joint 4e, 5e. As a result, it will be possible to cause these to be arranged in order of relative rigidity. Accordingly, this will make it possible to effectively suppress occurrence of localized differences in rigidity in the tire width direction D1.

It will thus be possible to suppress occurrence of localized differences in rigidity in the tire width direction D1 and in the tire circumferential direction D3 at outer end portions 4c, 5c of connecting portions 4, 5 and outer annular portion 3. Accordingly, because it will be possible to suppress occurrence of situations in there might otherwise be concentration of stress, this will make it possible, for example, to cause contact patch pressure of tire 1 with respect to the road surface to be made uniform.

As described above, the non-pneumatic tire 1 of the embodiment includes:

an inner annular portion 2 and an outer annular portion 3 that are arranged in concentric fashion; and a plurality of connecting portions 4, 5 that connect the inner annular portion 2 and the outer annular portion 3;

wherein the plurality of connecting portions 4, 5 comprise first connecting portions 4 extending in such fashion as to be directed from a first side D1*a* in a tire width direction D1 of the inner annular portion 2 toward a second side D1*b* in the tire width direction D1 of the outer annular portion 3, and second connecting portions 5 extending in such fashion as to be directed from the second side D1*b* in the tire width direction D1 of the inner annular portion 2 toward the first side D1*a* in the tire width direction D1 of the outer annular portion 3; and wherein at least one of the plurality of connecting portions 4, 5 comprises a main body portion 6 having a width that is constant or that increases in tapered fashion by a constant ratio ("that is constant" in this embodiment) as viewed in the tire width direction D1, and an reinforcing portion 7(8) that connects an end in a tire circumferential direction D3 of the main body portion 6 and the annular portion 2(3).

In accordance with such constitution, because reinforcing portion(s) 7, 8 connect at least one of either inner annular portion 2 or outer annular portion 3 with tire circumferential direction D3 side(s) of main body portion(s) 6, connecting portions 4, 5 are reinforced in the tire circumferential direction D3. This makes it possible to increase the rigidity of connecting portions 4, 5 with respect to the tire circumferential direction D3.

Further, in the non-pneumatic tire 1 of the embodiment, wherein the reinforcing portions 7, 8 include the inner reinforcing portion 7 connects an end in a tire circumferential direction D3 of the main body portion 6 and the inner annular portion 2, the outer reinforcing portion 8 connects an end in a tire circumferential direction D3 of the main body portion 6 and the outer annular portion 3; and volume of the inner reinforcing portion 7 is greater than volume of the outer reinforcing portion 8.

In accordance with such constitution, whereas forces from the wheel hub are transmitted in order from inner annular portion 2 to connecting portions 4, 5 to outer annular portion 3, volumes of inner reinforcing portions 7 are comparatively large. This makes it possible to increase the rigidity of the wheel hub side of connecting portions 4, 5.

Further, in the non-pneumatic tire 1 of the embodiment, wherein the first connecting portions 4 and the second connecting portions 5 are arrayed in alternating fashion in the tire circumferential direction D3;

as viewed in the tire width direction D1, the main body portion 6 of at least one of the first connecting portions 4 appears to be separated in the tire circumferential direction D3 from the main body portion 6 of an adjacent one of the second connecting portions 5 which is adjacent to the at least one first connecting portion 4 in the tire circumferential direction D3;

the at least one first connecting portion 4 comprises a first joint 4*d*(4*e*) by which the at least one first connecting portion 4 is joined to the annular portion 2(3);

the adjacent second connecting portion 5 comprises a second joint 5*d*(5*e*) by which the adjacent second connecting portion 5 is joined to the annular portion 2(3); and the first joint 4*d*(4*e*) appears to overlap the second joint 5*d*(5*e*) as viewed in the tire width direction D1.

In accordance with such constitution, joints 4*d*, 5*d* (4*e*, 5*e*) of adjacent connecting portions 4, 5 are present in mutually continuous fashion in the tire circumferential direction D3. This makes it possible to suppress occurrence of localized differences in rigidity in the tire circumferential direction D3.

Further, in the non-pneumatic tire 1 of the embodiment, wherein the adjacent second connecting portion 5 comprises a main body joint by which the main body portion 6 of the adjacent second connecting portion 5 is joined to the annular portion 2(3); and the first joint 4*d*(4*e*) appears to overlap the main body joint of the adjacent second connecting portion 5 as viewed in the tire width direction D1.

In accordance with such constitution, joints 4*d* (4*e*) of adjacent first connecting portions 4 are present in regions at tire width direction D1 sides of regions at locations on second connecting portions 5 at which main body portions 6 are joined to annular portion 2 (3). This makes it possible to suppress occurrence of localized differences in rigidity in the tire width direction D1.

Further, in the non-pneumatic tire 1 of the embodiment, wherein the reinforcing portion 7, 8 of the at least one first connecting portion 4 comprises an inner portion 7*a*, 8*a* and an outer portion 7*b*, 8*b* in the tire width direction D1;

division into the inner portion 7*a*, 8*a* and the outer portion 7*b*, 8*b* is based on bisection of the reinforcing portion 7, 8 in the tire width direction D1; and volume of the inner portion 7*a*, 8*a* is greater than volume of the outer portion 7*b*, 8*b*.

In accordance with such constitution, because the volume of inner portion 7*a*, 8*a* is comparatively large, it is possible to cause the location at which main body portion 6 of adjacent connecting portion 4, 5 is joined to annular portion 2, 3, inner portion 7*a*, 8*a* of reinforcing portion 7, 8 of adjacent connecting portion 5, 4, and outer portion 7*b*, 8*b* of reinforcing portion 7, 8 of adjacent connecting portion 5, 4 to be arranged in this order in the tire width direction D1. Because this makes it possible to cause these to be arranged in order of relative rigidity in the tire width direction D1, this will make it possible to effectively suppress occurrence of localized differences in rigidity in the tire width direction D1.

The non-pneumatic tire 1 is not limited to the configuration of the embodiment described above, and the effects are not limited to those described above. It goes without saying that the non-pneumatic tire 1 can be variously modified without departing from the scope of the subject matter of the present invention. For example, the constituents, methods, and the like of various modified examples described below may be arbitrarily selected and employed as the constituents, methods, and the like of the embodiments described above, as a matter of course.

Figure 11:
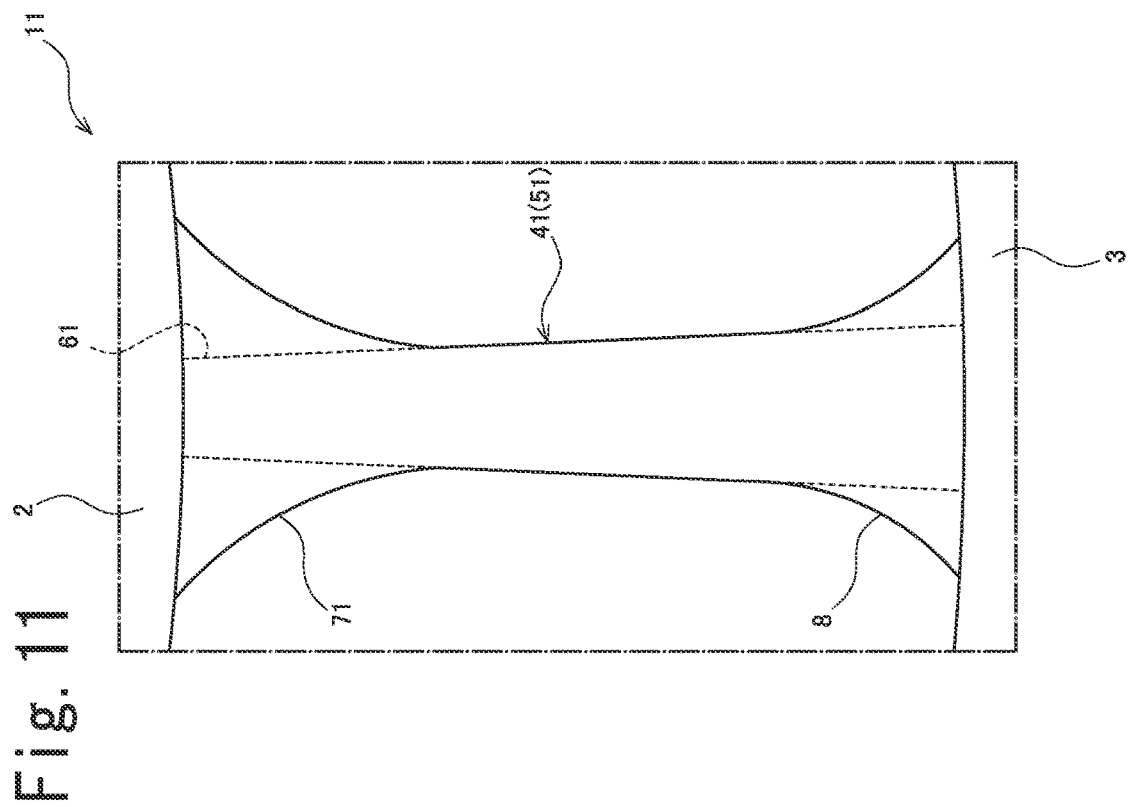
FIG. 11 is a side view of the principal components of a non-pneumatic tire associated with another embodiment in which only one connecting portion is shown.

(1) The constitution of non-pneumatic tire 1 associated with the foregoing embodiment is such that widths of main body portions 6 appear to be constant as viewed in the tire width direction D1. However, non-pneumatic tire 1 is not limited to such constitution. For example, as shown in FIG. 11, it is also possible to adopt a constitution for a non-pneumatic tire 11 in which the width as viewed in the tire width direction D1 of main body portion 61 increases in tapered fashion by a constant (here understood to mean not only the situation in which this is the same but also situations in which this is approximately the same) ratio.

Thus, as viewed in the tire width direction D1, the boundary of main body portion 61 (more specifically, the boundary between main body portion 61 and reinforcing portion 71, 8 or empty space) is in the shape of a straight line. Note that while the constitution is such that the width as viewed in the tire width direction D1 of main body portion 61 associated with FIG. 11 increases as one proceeds toward the exterior in the tire radial direction D2, there is no limitation with respect to such constitution. For example, it is also possible to adopt a constitution in which the width as viewed in the tire width direction D1 of main body portion 61 increases as one proceeds toward the interior in the tire radial direction D2.

(2) Furthermore, the constitution of non-pneumatic tire 1 associated with the foregoing embodiment is such that connecting portions 4, 5 are provided with both inner reinforcing portions 7 and outer reinforcing portions 8. However, non-pneumatic tire 1 is not limited to such constitution. For example, it is also possible to adopt a constitution in which connecting portions 4, 5 are provided with only outer reinforcing portions 8 and are not provided with inner reinforcing portions 7.

Figure 12:
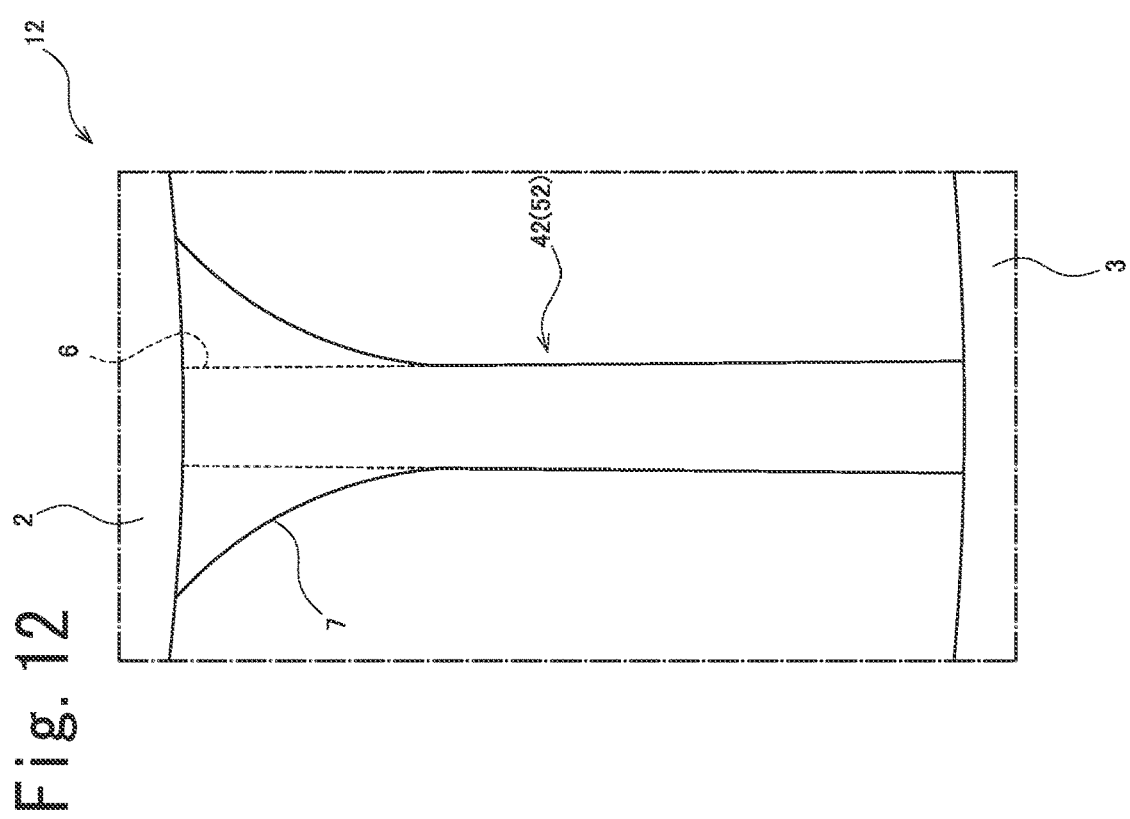
FIG. 12 is a side view of the principal components of a non-pneumatic tire associated with yet another embodiment in which only one connecting portion is shown.

(2-1) Furthermore, for example as shown in FIG. 12, it is also possible to adopt a constitution for a non-pneumatic tire 12 in which connecting portions 42, 52 are provided with only inner reinforcing portions 7 and are not provided with outer reinforcing portions 8. In accordance with such constitution, whereas the size of gaps between adjacent connecting portions 42, 52 increases as one proceeds toward the exterior in the tire radial direction D2, the pivot point (inflection point) during elastic deformation in the tire circumferential direction D3 of connecting portions 42, 52 can be made to lie even further toward the exterior in the tire radial direction D2. This makes it possible to effectively suppress occurrence of situations in which adjacent connecting portions 42, 52 might otherwise come in contact with each other during elastic deformation in the tire circumferential direction D3 of connecting portions 42, 52.

(3) Furthermore, the constitution of non-pneumatic tire 1 associated with the foregoing embodiment is such that all of the connecting portions 4, 5 are provided with reinforcing portions 7, 8. However, non-pneumatic tire 1 is not limited to such constitution. For example, it is also possible to adopt a constitution in which there is one connecting portion 4, 5 that has reinforcing portion(s) 7, 8. Furthermore, for example, a constitution in which the connecting portions 4, 5 that have reinforcing portion(s) 7, 8 is not less than 50% of all of the connecting portions 4, 5 is preferred, a constitution in which this is not less than 75% is more preferred, and a constitution in which this is 100% is extremely preferred.

(4) Furthermore, the constitution of non-pneumatic tire 1 associated with the foregoing embodiment is such that first connecting portions 4 and second connecting portions 5 are shaped so as to be symmetric with respect to the tire equatorial plane S1 as viewed in the tire circumferential direction D3. However, non-pneumatic tire 1 is not limited to such constitution. For example, as shown in FIG. 13 and FIG. 14, it is also possible to adopt a constitution for a non-pneumatic tire 13 in which first connecting portions 43 and second connecting portions 53 are shaped so as to be asymmetric with respect to the tire equatorial plane S1 as viewed in the tire circumferential direction D3.

Figure 13:
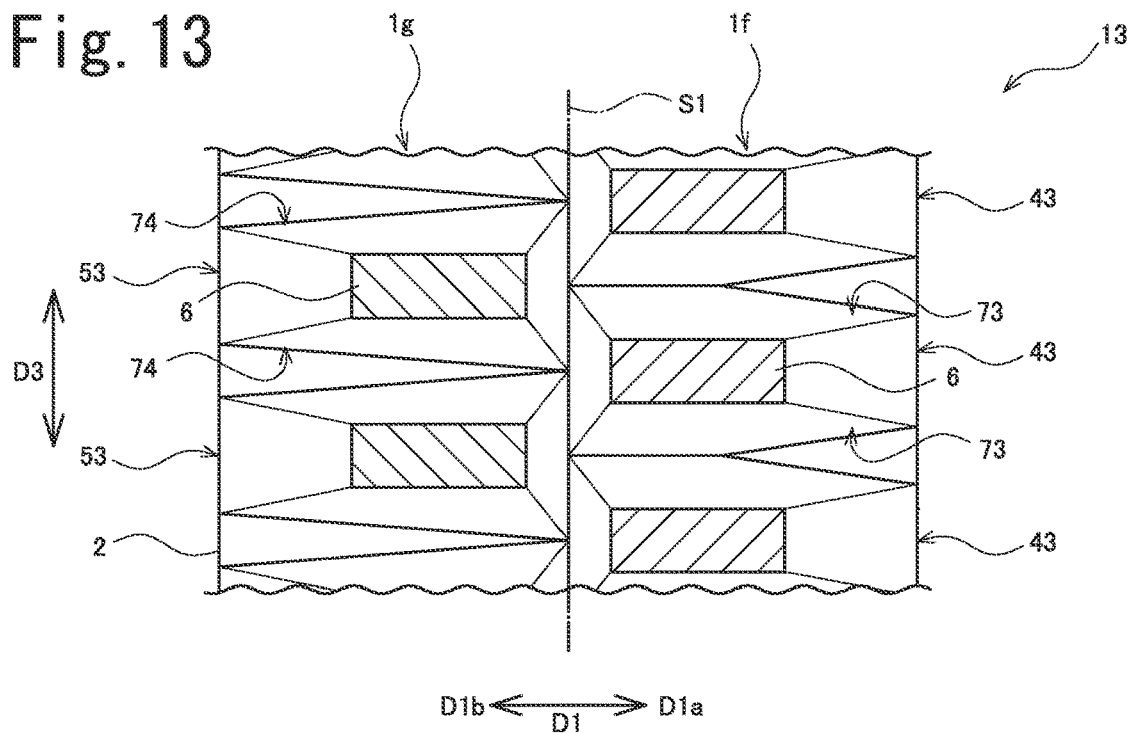
FIG. 13 is a view of a section taken along the tire circumferential direction at a non-pneumatic tire associated with yet another embodiment showing the situation as it would exist if unwrapped so as to lie in a single plane as viewed from a location toward the interior therefrom in the tire radial direction.
Figure 14:
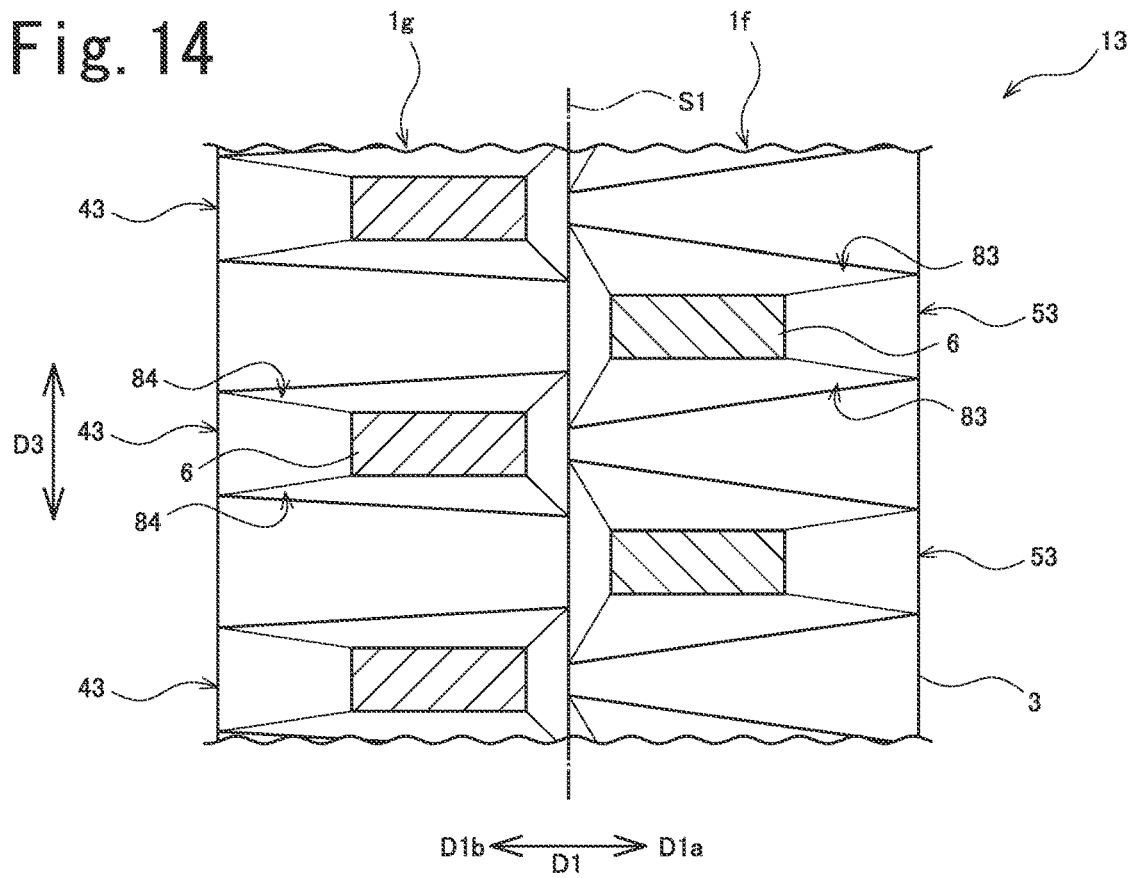
FIG. 14 is a view of a section taken along the tire circumferential direction at a non-pneumatic tire associated with same embodiment showing the situation as it would exist if unwrapped so as to lie in a single plane as viewed from a location toward the exterior therefrom in the tire radial direction.

(4-1) Non-pneumatic tire 13 associated with FIG. 13 and FIG. 14 is provided with first width portion if which is the portion on the first width direction side D1a of tire equatorial plane S1, and second width portion 1g which is the portion on the second width direction side D1b of tire equatorial plane S1. Furthermore, tire 13 may be mounted on a vehicle in such fashion that first width portion if is on the outboard side thereof, or it may be mounted on a vehicle in such fashion that second width portion 1g is on the outboard side thereof.

Volume of inner reinforcing portions 73 at first width portion if is greater than volume of inner reinforcing portions 74 at second width portion 1g. That is, volume of inner reinforcing portions 73 of first connecting portions 43 is greater than volume of inner reinforcing portions 74 of second connecting portions 53. Furthermore, volume of outer reinforcing portions 83 at first width portion if is greater than volume of outer reinforcing portions 84 at second width portion 1g. That is, volume of outer reinforcing portions 83 of second connecting portions 53 is greater than volume of outer reinforcing portions 84 of first connecting portions 43.

Accordingly, the total volume of reinforcing portions 73, 83 at first width portion if is greater than the total volume of reinforcing portions 74, 84 at second width portion 1g. In the context of a constitution in which the total volume of reinforcing portions 73, 83 at first width portion if is greater than the total volume of reinforcing portions 74, 84 at second width portion 1g, there is no particular limitation with respect to the relative magnitudes of the total volume of inner reinforcing portions 73 at first width portion if and the total volume of inner reinforcing portions 74 at second width portion 1g, or with respect to the relative magnitudes of the total volume of outer reinforcing portions 83 at first width portion if and the total volume of outer reinforcing portions 84 at second width portion 1g.

Figure 15:
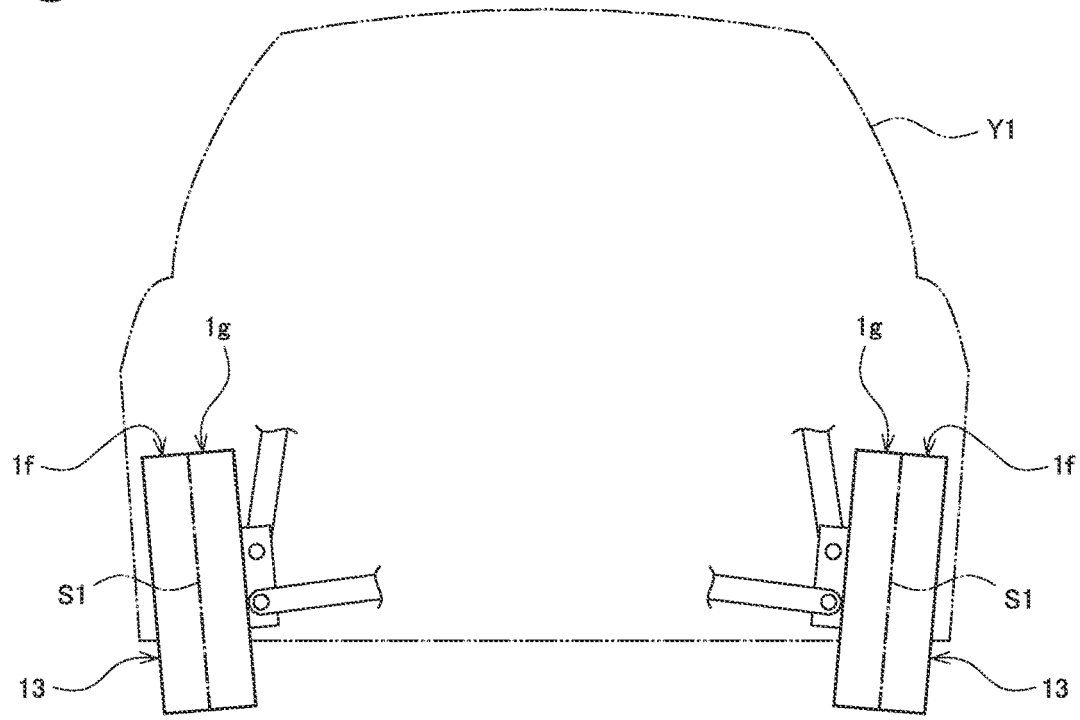
FIG. 15 is a drawing in which a non-pneumatic tire associated with same embodiment is mounted on a vehicle.

In addition, for example as shown in FIG. 15, in a situation in which tire 13 is mounted on vehicle Y1 in such fashion as to have positive camber, tire 13 may be mounted on vehicle Y1 in such fashion that first width portion if is on the outboard side thereof. This makes it possible to increase rigidity at outboard locations when tire 13 is mounted on a vehicle.

Accordingly, because this will make it possible to suppress occurrence of strain at outboard locations where load is comparatively large, this will make it possible to reduce rolling resistance of tire 13, as a result of which it will be possible to improve the fuel consumption efficiency of the vehicle. And because it will also be possible, for example, even where the slip angle of tire 13 is large, to cause production of large cornering forces, this will also make it possible to improve performance with respect to stability in handling during turns.

Figure 16:
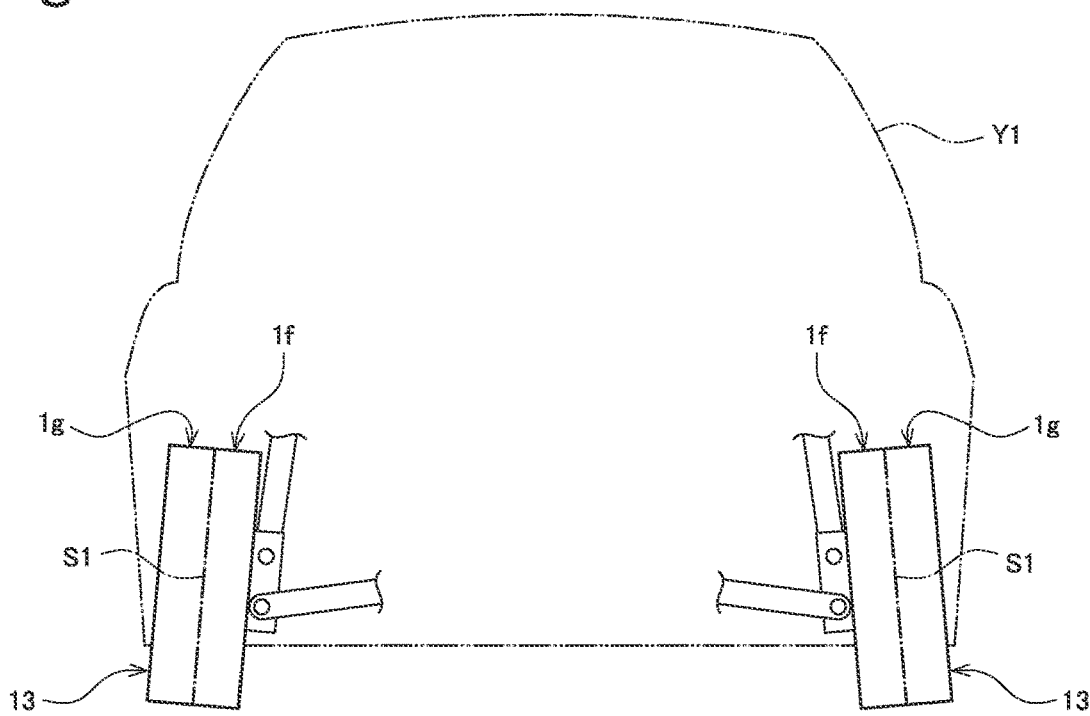
FIG. 16 is a drawing in which a non-pneumatic tire associated with same embodiment is mounted on a vehicle.

Furthermore, for example as shown in FIG. 16, in a situation in which tire 13 is mounted on vehicle Y1 in such fashion as to have negative camber, tire 13 may be mounted on vehicle Y1 in such fashion that first width portion if is on the inboard side thereof. This makes it possible to increase rigidity at inboard locations when tire 13 is mounted on a vehicle. Accordingly, because this will make it possible to suppress occurrence of strain at inboard locations where load is comparatively large, this will make it possible to reduce rolling resistance of tire 13, as a result of which it will be possible to improve the fuel consumption efficiency of the vehicle.

Thus, the constitution of non-pneumatic tire 13 associated with FIG. 13 and FIG. 14 is such that that portion of total volume of all of the inner reinforcing portions 73, 74 and all of the outer reinforcing portions 83, 84 which is disposed on the first side D1a in the tire width direction D1 of a tire equatorial plane S1 is greater than that portion of total volume of all of the inner reinforcing portions 73, 74 and all of the outer reinforcing portions 83, 84 which is disposed on the second side D1b in the tire width direction D1 of the tire equatorial plane S1.

In accordance with such constitution, because the total volume of the plurality of reinforcing portions 73, 83 disposed on the first side D1a in the tire width direction D1 is comparatively large, this makes it possible to increase rigidity on the first side D1a in the tire width direction D1. This makes it possible to adjust the orientation (whether toward the inside or the outside) with respect to vehicle Y1 in correspondence to camber when mounted on vehicle Y1.

(5) Furthermore, the constitution of non-pneumatic tire 1 associated with the foregoing embodiment is such that this is a tire 1 for which a vehicle mounting orientation is not indicated. However, non-pneumatic tire 1 is not limited to such constitution. For example, it is also possible to adopt a constitution in which non-pneumatic tire 1 is a tire 1 for which a vehicle mounting direction is indicated. Note that in accordance with such constitution tire 1 may comprise, e.g., at a side face portion of support structure 1a, an indicator region that indicates an orientation in which the tire is to be mounted on the vehicle.

(5-1) For example, when tire 1 is mounted on a vehicle, large forces act at inboard locations of tire 1 during braking. For this reason, the constitution may be such that total volume of reinforcing portions 7, 8 at locations which will be to the inboard side of tire equatorial plane S1 when mounted on a vehicle is greater than total volume of reinforcing portions 7, 8 at locations which will be to the outboard side of tire equatorial plane S1 when mounted on a vehicle. Such a constitution will make it possible to effectively improve braking performance.

(5-2) Furthermore, for example, when tire 1 is mounted on a vehicle, large forces act at outboard locations of tire 1 when tire 1 is an outside wheel during a turn. For this reason, the constitution may be such that total volume of reinforcing portions 7, 8 at locations which will be to the outboard side of tire equatorial plane S1 when mounted on a vehicle is greater than total volume of reinforcing portions 7, 8 at locations which will be to the inboard side of tire equatorial plane S1 when mounted on a vehicle. Such a constitution will make it possible to effectively improve performance during turns.

(5-3) Furthermore, for example, when tire 1 is mounted on a vehicle, whereas large forces act at inboard locations of tire 1 during braking, for forces from the wheel hub to be effectively transmitted to tread region 1d at such time, transmission of forces at locations toward the interior in the tire radial direction D2 will be important. On the other hand, for example, when tire 1 is mounted on a vehicle, whereas large forces act at outboard locations of tire 1 when tire 1 is an outside wheel during a turn, larger forces will act at locations toward the exterior in the tire radial direction D2 as a result of contact with the road surface at such time.

For this reason, the constitution may be such that total volume of inner reinforcing portions 7 at locations which will be to the inboard side of tire equatorial plane S1 when mounted on a vehicle is greater than total volume of inner reinforcing portions 7 at locations which will be to the outboard side of tire equatorial plane S1 when mounted on a vehicle, and such that total volume of outer reinforcing portions 8 at locations which will be to the outboard side of tire equatorial plane S1 when mounted on a vehicle is greater than total volume of outer reinforcing portions 8 at locations which will be to the inboard side of tire equatorial plane S1 when mounted on a vehicle. Such a constitution will make it possible to improve braking performance and performance during turns.

(6) Furthermore, the constitution of non-pneumatic tire 1 associated with the foregoing embodiment is such that the volume of inner reinforcing portions 7 is greater than the volume of outer reinforcing portions 8. However, while such constitution is preferred, non-pneumatic tire 1 is not limited to such constitution. For example, it is also possible to adopt a constitution in which the volume of inner reinforcing portions 7 is not greater than the volume of outer reinforcing portions 8.

(7) Furthermore, the constitution of non-pneumatic tire 1 associated with the foregoing embodiment is such that first connecting portions 4 and second connecting portions are arrayed in alternating fashion in the tire circumferential direction D3. However, while such constitution is preferred, non-pneumatic tire 1 is not limited to such constitution. It is also possible to adopt a constitution in which, for example, a portion of first connecting portions 4, 4 are arranged in mutually adjacent fashion in the tire circumferential direction D3, and it is also possible to adopt a constitution in which, for example, a portion of second connecting portions 5, 5 are arranged in mutually adjacent fashion in the tire circumferential direction D3.

(8) Furthermore, the constitution of non-pneumatic tire 1 associated with the foregoing embodiment is such that main body portions 6 of connecting portions 4, 5 appear to be separated from main body portions 6 of adjacent connecting portions 5, 4 as viewed in the tire width direction D1. However, non-pneumatic tire 1 is not limited to such constitution. For example, it is also possible to adopt a constitution in which main body portions 6 of connecting portions 4, 5 appear to overlap main body portions 6 of adjacent connecting portions 5, 4 as viewed in the tire width direction D1.

(9) Furthermore, the constitution of non-pneumatic tire 1 associated with the foregoing embodiment is such that inner joints 4d, 5d of connecting portions 4, 5 appear to overlap inner joints 5d, 4d of adjacent connecting portions 5, 4 as viewed in the tire width direction D1. However, while such constitution is preferred, non-pneumatic tire 1 is not limited to such constitution. For example, it is also possible to adopt a constitution in which inner joints 4d, 5d of connecting portions 4, 5 appear to be separated in the tire circumferential direction D3 from inner joints 5d, 4d of adjacent connecting portions 5, 4 as viewed in the tire width direction D1.

(10) Furthermore, the constitution of non-pneumatic tire 1 associated with the foregoing embodiment is such that outer joints 4e, 5e of connecting portions 4, 5 appear to overlap outer joints 5e, 4e of adjacent connecting portions 5, 4 as viewed in the tire width direction D1. However, while such constitution is preferred, non-pneumatic tire 1 is not limited to such constitution. For example, it is also possible to adopt a constitution in which outer joints 4e, 5e of connecting portions 4, 5 appear to be separated in the tire circumferential direction D3 from outer joints 5e, 4e of adjacent connecting portions 5, 4 as viewed in the tire width direction D1.

(11) Furthermore, the constitution of non-pneumatic tire 1 associated with the foregoing embodiment is such that inner joints 4d, 5d of connecting portions 4, 5 appear to overlap locations at which main body portions 6 of adjacent connecting portions 5, 4 are joined to inner annular portion 2 as viewed in the tire width direction D1. However, while such constitution is preferred, non-pneumatic tire 1 is not limited to such constitution. For example, it is also possible to adopt a constitution in which inner joints 4d, 5d of connecting portions 4, 5 appear to be separated in the tire circumferential direction D3 from locations at which main body portions 6 of adjacent connecting portions 5, 4 are joined to inner annular portion 2 as viewed in the tire width direction D1.

(12) Furthermore, the constitution of non-pneumatic tire 1 associated with the foregoing embodiment is such that outer joints 4e, 5e of connecting portions 4, 5 appear to overlap locations at which main body portions 6 of adjacent connecting portions 5, 4 are joined to outer annular portion 3 as viewed in the tire width direction D1. However, while such constitution is preferred, non-pneumatic tire 1 is not limited to such constitution. For example, it is also possible to adopt a constitution in which outer joints 4e, 5e of connecting portions 4, 5 appear to be separated in the tire circumferential direction D3 from locations at which main body portions 6 of adjacent connecting portions 5, 4 are joined to outer annular portion 3 as viewed in the tire width direction D1.

(13) Furthermore, the constitution of non-pneumatic tire 1 associated with the foregoing embodiment is such that volumes of inner portions 7a, 8a in the tire width direction D1 of reinforcing portions 7, 8 are greater than volumes of outer portions 7b, 8b in the tire width direction D1 of reinforcing portions 7, 8. However, while such constitution is preferred, non-pneumatic tire 1 is not limited to such constitution. For example, it is also possible to adopt a constitution in which the volume of inner portion 7a of inner reinforcing portion 7 is not greater than the volume of outer portion 7b of inner reinforcing portion 7. Furthermore, for example, it is also possible to adopt a constitution in which the volume of inner portion 8a of outer reinforcing portion 8 is not greater than the volume of outer portion 8b of outer reinforcing portion 8.

(14) Furthermore, the constitution of non-pneumatic tire 1 associated with the foregoing embodiment is such that inner reinforcing portions 7, 7 of adjacent first connecting portions 4, 4 are mutually contiguous, and inner reinforcing portions 7, 7 of adjacent second connecting portions 5, 5 are mutually contiguous. However, non-pneumatic tire 1 is not limited to such constitution. For example, it is also possible to adopt a constitution in which inner reinforcing portions 7, 7 of adjacent first connecting portions 4, 4 are separated from each other in the tire circumferential direction D3. Furthermore for example, it is also possible to adopt a constitution in which inner reinforcing portions 7, 7 of adjacent second connecting portions 5, 5 are separated from each other in the tire circumferential direction D3.

(15) Furthermore, the constitution of non-pneumatic tire 1 associated with the foregoing embodiment is such that outer reinforcing portions 8, 8 of adjacent first connecting portions 4, 4 are separated from each other in the tire circumferential direction D3, and outer reinforcing portions 8, 8 of adjacent second connecting portions 5, 5 are separated from each other in the tire circumferential direction D3. However, non-pneumatic tire 1 is not limited to such constitution. For example, it is also possible to adopt a constitution in which outer reinforcing portions 8, 8 of adjacent first connecting portions 4, 4 are mutually contiguous. Furthermore, for example, it is also possible to adopt a constitution in which outer reinforcing portions 8, 8 of adjacent second connecting portions 5, 5 are mutually contiguous.

(16) Furthermore, the constitution of non-pneumatic tire 1 associated with the foregoing embodiment is such that thicknesses (dimension visible in the tire width direction D1) of inner reinforcing portions 7 increase as one proceeds toward the interior in the tire radial direction D2, and thicknesses (dimension visible in the tire width direction D1) of outer reinforcing portions 8 increase as one proceeds toward the exterior in the tire radial direction D2. However, non-pneumatic tire 1 is not limited to such constitution.

Figure 17:
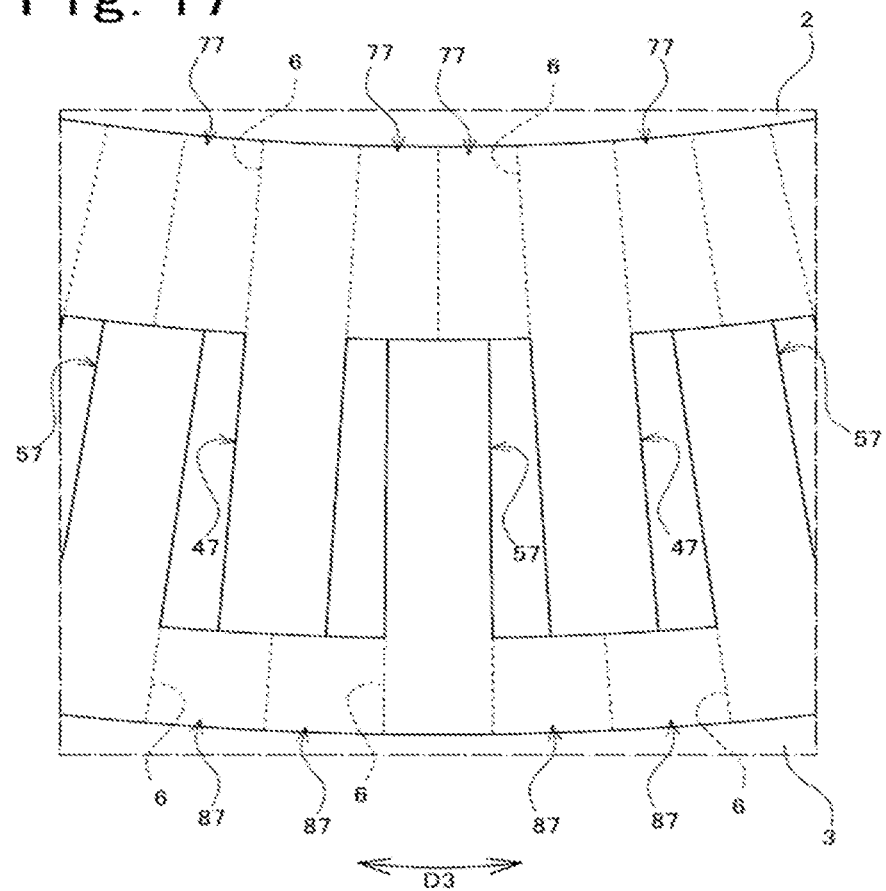
FIG. 17 is a side view of the principal components of a non-pneumatic tire associated with yet another embodiment.
Figure 18:
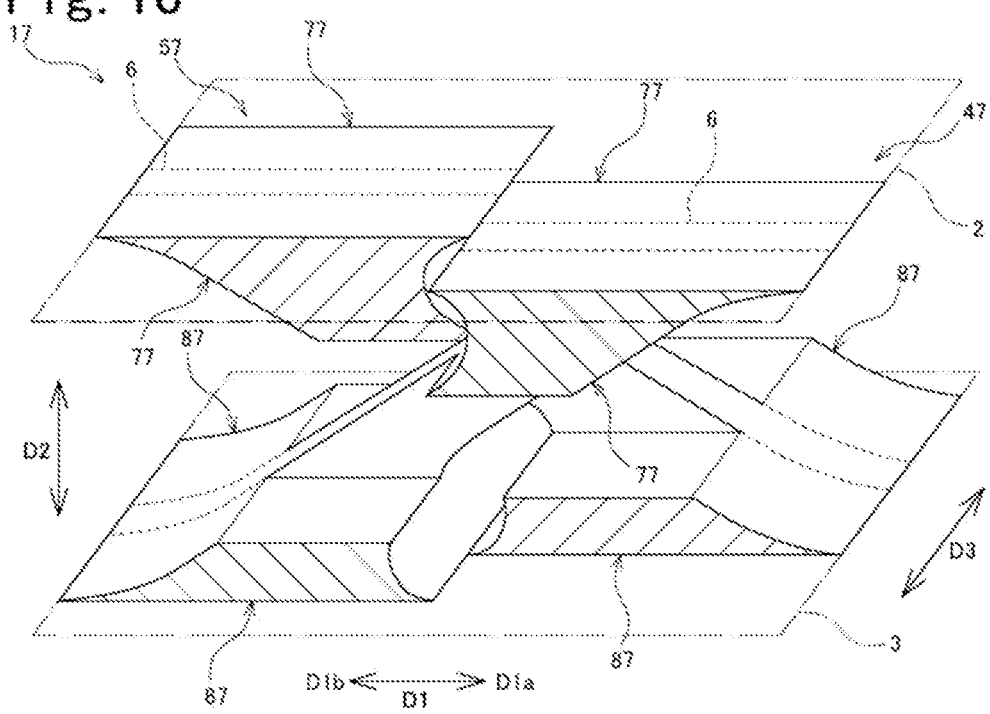
FIG. 18 is a perspective view of the principal components of a non-pneumatic tire associated with same embodiment in which only two connecting portions are shown.

For example, as shown in FIG. 17 and FIG. 18, it is also possible to adopt a constitution in which thickness of inner reinforcing portion 77 is constant (here understood to mean not only the situation in which this is the same but also situations in which this is approximately the same) everywhere therealong in the tire radial direction D2. Furthermore, as shown in FIG. 17 and FIG. 18, it is also possible to adopt a constitution in which thickness of outer reinforcing portion 87 is constant (here understood to mean not only the situation in which this is the same but also situations in which this is approximately the same) everywhere thereon the tire radial direction D2.

At non-pneumatic tire 17 associated with FIG. 17 and FIG. 18, inner reinforcing portions 77 extend in the tire circumferential direction D3 in such fashion as to cause mutual coupling of adjacent first connecting portions 47, 47 (and mutual coupling of second connecting portions 57, 57). Furthermore, outer reinforcing portions 87 extend in the tire circumferential direction D3 in such fashion as to cause mutual coupling of adjacent first connecting portions 47, 47 (and mutual coupling of second connecting portions 57, 57).

The invention claimed is:

1. A non-pneumatic tire comprising:
an inner annular portion and an outer annular portion that are arranged in concentric fashion; and
a plurality of connecting portions that connect the inner annular portion and the outer annular portion,
wherein the plurality of connecting portions comprise first connecting portions extending in such fashion as to be directed from a first side in a tire width direction of the inner annular portion toward a second side in the tire width direction of the outer annular portion, and second connecting portions extending in such fashion as to be directed from the second side in the tire width direction of the inner annular portion toward the first side in the tire width direction of the outer annular portion,
wherein at least one of the plurality of connecting portions comprises a main body portion having a width that is constant or that increases in tapered fashion by a constant ratio as viewed in the tire width direction, and an inner reinforcing portion that connects an end in a tire circumferential direction of the main body portion and the inner annular portion,
wherein the at least one of the plurality of connecting portions further comptises an outer reinforcing portion that connects the end in the tire circumferential direction of the main body portion and the outer annular portion,
wherein the first connecting portions and the second connecting portions are arrayed in alternating fashion in the tire circumferential direction,
wherein as viewed in the tire width direction, the main body portion of at least one of the first connecting appears to be separated in the tire circumferential direction from the main body portion of an adjacent one of the second connecting portions which is adjacent to the at least one first connecting portion in the tire circumferential direction,
wherein the at least one first connecting portion comprises a first inner joint b which the at least one first connecting portion is joined to the inner annular portion,
wherein the adjacent second connecting portion comprises a second inner joint by which the adjacent second connecting portion is joined to the inner annular portion, and
wherein the first inner joint appears to overlap the second inner joint as viewed in the tire width direction.

2. The non-pneumatic tire according to claim 1 wherein volume of the inner reinforcing portion is greater than volume of the outer reinforcing portion.

3. The non-pneumatic tire according to claim 1 wherein
the adjacent second connecting portion comprises a main body joint by which the main body portion of the adjacent second connecting portion is joined to the inner annular portion, and
the first inner joint appears to overlap the main body joint of the adjacent second connecting portion as viewed in the tire width direction.

4. The non-pneumatic tire according to claim 3 wherein
the inner reinforcing portion of the at least one first connecting portion comprises an inner portion and an outer portion in the tire width direction,
division into the inner portion and the outer portion is based on bisection of the inner reinforcing portion in the tire width direction, and
volume of the inner portion is greater than volume of the outer portion.

5. The non-pneumatic tire according to claim 1 wherein
the first connecting portions and the second connecting portions are arrayed in alternating fashion in the tire circumferential direction, and
the inner reinforcing portion of at least one of the first connecting portions is contiguous with the inner reinforcing portion of an adjacent one of the first connecting portions which is adjacent to the at least one first connecting portion in the tire circumferential direction.

6. The non-pneumatic tire according to claim 5 wherein the outer reinforcing portion of the at least one first connecting portion is separated in the tire circumferential direction from the outer reinforcing portion of the adjacent first connecting portion.

7. A non-pneumatic tire comprising:
an inner annular onion and an outer annular portion that are arranged in concentric fashion, and
a plurality of connecting portions that connect the inner annular portion and the outer annular portion,
wherein the plurality of connecting portions comprise first connecting portions extending in such fashion as to be directed from a first side in a tire width direction of the inner annular portion toward a second side in the tire width direction of the outer annular portion, and second connecting portions extendin in such fashion as to be directed from the second side in the tire width direction of the inner annular onion toward the first side in the tire width direction of the outer annular portion,
wherein at least one of the plurality of connecting portions comprises a main body portion having a width that is constant or that increases in tapered fashion by a constant ratio as viewed in the tire width direction, and an inner reinforcing portion that connects an end in a tire circumferential direction of the main body portion and the inner annular portion,
wherein the at least one of the pluralit of connecting portions further comprises an outer reinforcing portion that connects the end in the tire circumferential direction of the main body portion and the outer annular portion,
wherein the first connecting portions and the second connecting portion are arrayed in alternating fashion in the tire circumferential direction,
wherein as viewed in the tire width direction, the main body portion of at least one of the first connecting portions appears to be separated in the tire circumferential direction from the main body portion of an adjacent one of the second connecting portions which is adjacent to the at least one first connecting portion in the tire circumferential direction,
wherein the at least one first connecting portion comprises a first outer joint by which the at least one first connecting portion is joined to the outer annular portion,
wherein the adjacent second connecting portion comprises a second outer joint by which the adjacent second connecting portion is joined to the outer annular portion, and
wherein the first outer joint appears to overlap the second outer joint as viewed in the tire width direction.

8. The non-pneumatic tire according to claim 7 wherein
the adjacent second connecting portion comprises a main body joint by which the main body portion of the adjacent second connecting portion is joined to the outer annular portion, and
the first outer joint appears to overlap the main body joint of the adjacent second connecting portion as viewed in the tire width direction.

9. The non-pneumatic tire according to claim 8 wherein
the outer reinforcing portion of the at least one first connecting portion comprises an inner portion and an outer portion in the tire width direction,
division into the inner portion and the outer portion is based on bisection of the outer reinforcing portion in the tire width direction, and
volume of the inner portion is greater than volume of the outer portion.

10. A non-pneumatic comprising:
an inner annular portion and an outer annular portion that are arranged in concentric fashion; and
a plurality of connecting portions that connect the inner annular portion and the outer annular portion,
wherein the plurality of connecting portions comprise first connecting portions extending in such fashion as to be directed from a first side in a tire width direction of the inner annular portion toward a second side in the tire width direction of the outer annular portion and second connecting portions extending in such fashion as to be directed from the second side in the tire width direction of the inner annular portion toward the first side in the tire width direction of the outer annular portion,
wherein at least one of the plurality of connecting portions comprises a main body portion having a width that is constant or that increases in tapered fashion by a constant ratio as viewed in the tire width direction, and an inner reinforcing portion that connects an end in a tire circumferential direction of the main body portion and the inner annular portion,
wherein the at least one of the plurality of connecting portions further comprises an outer reinforcing portion that connects the end in the tire circumferential direction of the main body portion and the outer annular portion,
wherein the inner reinforcing portion is one of a plurality of inner reinforcing portions present at the non-pneumatic tire,
wherein the outer reinforcing portion is one of a plurality of outer reinforcing portions present at the non-pneumatic tire, and
wherein that portion of total volume of all of the inner reinforcing portions and all of the outer reinforcing portions which is disposed on the first side in the tire width direction of a tire equatorial plane is greater than that portion of total volume of all of the inner reinforcing portions and all of the outer reinforcing portions which is disposed on the second side in the tire width direction of the tire equatorial plane.

\* \* \* \* \*